United States Patent
Nakajima et al.

(10) Patent No.: US 11,628,639 B2
(45) Date of Patent: Apr. 18, 2023

(54) CONTACT LENS MANUFACTURING METHOD

(71) Applicant: HOYA CORPORATION, Tokyo (JP)

(72) Inventors: Takaharu Nakajima, Tokyo (JP); Takeshi Yoshida, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 225 days.

(21) Appl. No.: 16/338,634

(22) PCT Filed: Nov. 25, 2016

(86) PCT No.: PCT/JP2016/084988
§ 371 (c)(1),
(2) Date: Apr. 1, 2019

(87) PCT Pub. No.: WO2018/061224
PCT Pub. Date: Apr. 5, 2018

(65) Prior Publication Data
US 2019/0217561 A1    Jul. 18, 2019

(30) Foreign Application Priority Data
Sep. 30, 2016 (JP) .............................. JP2016-192854

(51) Int. Cl.
*B29D 11/00* (2006.01)
*G02C 13/00* (2006.01)
(Continued)

(52) U.S. Cl.
CPC ........ *B29D 11/00221* (2013.01); *B29C 33/44* (2013.01); *G02C 7/04* (2013.01);
(Continued)

(58) Field of Classification Search
CPC .............. B29D 11/00221; B29C 33/44; G02C 13/00; G02C 7/04
See application file for complete search history.

(56) References Cited

U.S. PATENT DOCUMENTS 3,893,200 A     7/1975  Wanciak
4,909,969 A *   3/1990  Wood .................... B29C 33/448
                                                  264/1.1
(Continued)

FOREIGN PATENT DOCUMENTS

EP     0 936 969 A1    8/1999
JP     S58-52813 A     3/1983
(Continued)

OTHER PUBLICATIONS

Feb. 28, 2017 Search Report issued in International Patent Application No. PCT/JP2016/084988.
(Continued)

*Primary Examiner* — Mathieu D Vargot
(74) *Attorney, Agent, or Firm* — Oliff PLC

(57) ABSTRACT

A contact lens manufacturing method for removing a contact lens from a pair of molds, the contact lens being produced by polymerizing a monomer included in the pair of molds which are obtained by assembling a lower mold for forming a front curve of the contact lens and an upper mold for forming a base curve of the contact lens, the method including: (A) a first peeling step to peel the contact lens from the lens formation surface of the upper mold; (B) a separation step to separate the contact lens from the lens formation surface of the upper mold; (C) a second peeling step to peel the contact lens whose periphery sticks to the lens formation surface of the lower mold; and (D) a third peeling step to peel the contact lens, whose periphery has been peeled, from the lens formation surface of the lower mold.

19 Claims, 14 Drawing Sheets

(51) Int. Cl.
  *B29C 33/44* (2006.01)
  *G02C 7/04* (2006.01)
  *B29K 83/00* (2006.01)
  *B29K 105/00* (2006.01)

(52) U.S. Cl.
  CPC .......... *G02C 13/00* (2013.01); *B29K 2083/00* (2013.01); *B29K 2105/0061* (2013.01)

(56) References Cited

U.S. PATENT DOCUMENTS

| | | | |
|---|---|---|---|
| 5,079,791 A * | 1/1992 | Grech | B25B 31/00 |
| | | | 29/267 |
| 5,200,121 A | 4/1993 | Hagmann et al. | |
| 5,457,834 A * | 10/1995 | Allen, Sr. | B25C 11/00 |
| | | | 7/151 |
| 6,033,603 A | 3/2000 | Lesczynski et al. | |
| 6,149,562 A | 11/2000 | Patel et al. | |
| 6,428,723 B1 * | 8/2002 | Lesczynski | B29D 11/00 |
| | | | 264/1.1 |
| 2004/0061246 A1 | 4/2004 | Cardiff et al. | |
| 2006/0202367 A1 | 9/2006 | Knutzen et al. | |
| 2007/0035049 A1 | 2/2007 | Bruce et al. | |
| 2007/0138670 A1 | 6/2007 | Beebe et al. | |
| 2008/0127473 A1 | 6/2008 | Yu | |
| 2012/0001353 A1 | 1/2012 | Beebe et al. | |
| 2014/0035176 A1 | 2/2014 | Hamilton | |
| 2016/0176093 A1 | 6/2016 | Gibson et al. | |

FOREIGN PATENT DOCUMENTS

| | | | |
|---|---|---|---|
| JP | S58-76597 U | | 5/1983 |
| JP | H04-226419 A | | 8/1992 |
| JP | 3009278 U | | 4/1995 |
| JP | 3050039 U | | 6/1998 |
| JP | 2002-515837 A | | 5/2002 |
| JP | 2003-512206 A | | 4/2003 |
| JP | 2006-150964 A | | 6/2006 |
| JP | 2007-47804 A | | 2/2007 |
| JP | 2008-049480 A | | 3/2008 |
| JP | 2008-155504 | * | 7/2008 |
| JP | 2008-155504 A | | 7/2008 |
| JP | 2011-104792 A | | 6/2011 |
| JP | 5428005 B2 | | 12/2013 |
| JP | 2014-008695 A | | 1/2014 |
| WO | 01/30558 A1 | | 5/2001 |
| WO | 2016/097739 A1 | | 6/2016 |

OTHER PUBLICATIONS

Feb. 28, 2017 Written Opinion issued in International Patent Application No. PCT/JP2016/084988.
Oct. 19, 2020 Extended Search Report issued in European Patent Application No. 16917773.0.
May 25, 2020 Partial Supplementary Search Report issued in European Patent Application No. 16917773.0.
Apr. 2, 2019 International Preliminary Report on Patentability issued in International Patent Application No. PCT/JP2016/084988.
May 20, 2022 Extended European Search Report issued in European Application 22153598.2.
May 27, 2022 Extended European Search Report issued in European Application 22153600.6.
Shinano, "Fork Chisel", Jan. 1, 2015 (XP055918053), Retrieved from the Internet: URL:https://cdnll.bigcommerce.com/s-47h8ix 8czq/images/stencil/1280x1280/products/16278/45646/SI803J_56532. 1588745338.jpg?c=2, retrieved on May 4, 2022, figure 1.

* cited by examiner

FIG. 14

|  |  | AA1 | AA2 | AA3 | AA4 | AA5 | AA6 | AA7 | AA8 | BB1 | BB2 | BB3 | BB4 | BB5 |
|---|---|---|---|---|---|---|---|---|---|---|---|---|---|---|
| First peeling step | CC | DD | DD | DD | DD | DD | DD | EE | DD | — | DD | EE | EE | EE |
|  | Diameter (mm) | 7.0 | 8.0 | 9.0 | 8.0 | 8.0 | 5.0 | 7.8 | 8.0 | — | 8.0 | 7.8 | 7.8 | 7.8 |
|  | FF | 200 | 200 | 200 | 200 | 200 | 200 | 200 | 200 | — | 200 | 200 | 200 | 200 |
|  | GG | 0.35 | 0.35 | 0.35 | 0.35 | 0.35 | 0.35 | 0.35 | 0.35 | — | 0.35 | 0.35 | 0.35 | 0.35 |
| Second peeling step | HH | II | II | II | II | II | II | II | II | II | — | — | II | II |
|  | Diameter (mm) | 12.9 | 12.9 | 12.9 | 13.3 | 13.3 | 13.3 | 13.3 | 13.3 | 12.9 | — | — | 13.1 | 13.3 |
|  | JJ | 9.5 | 9.5 | 9.5 | 11.5 | 11.5 | 11.5 | 11.5 | 11.5 | 9.5 | — | — | 11.5 | 11.5 |
|  | FF | 200 | 200 | 200 | 200 | 200 | 200 | 200 | 200 | 200 | — | — | 200 | 200 |
|  | GG | 1.7 | 1.7 | 1.7 | 1.7 | 1.7 | 1.7 | 1.7 | 1.7 | 1.7 | — | — | 1.7 | 1.7 |
| Third peeling step | HH | II | II | II | KK | KK | KK | KK | KK | II | II | KK | KK | — |
|  | LL | 9.0 | 9.0 | 9.0 | 7.8 | 8.0 | 7.8 | 8.0 | 7.6 | 9.0 | 9.0 | 7.8 | 7.8 | — |
|  | MM | — | — | 10.0 | 6.7 | 7.0 | 6.7 | 7.0 | 6.5 | — | 10.0 | 6.7 | 6.7 | — |
|  | JJ | 10.0 | 10.0 | 10.0 | — | — | — | — | — | 10.0 | 10.0 | — | — | — |
|  | FF | 200 | 200 | 200 | 200 | 200 | 200 | 200 | 200 | 200 | 200 | 200 | 200 | — |
|  | GG | 4.4 | 4.4 | 4.4 | 4.4 | 4.4 | 4.4 | 4.4 | 4.4 | 4.4 | 4.4 | 4.4 | 4.4 | — |
| Sample number |  | 30 | 30 | 30 | 30 | 30 | 30 | 30 | 30 | 30 | 30 | 30 | 30 | 30 |
| Lower mold retention ability (%) |  | 100 | 100 | 100 | 100 | 100 | 100 | 93 | 100 | 40 | 100 | 90 | 90 | 30 |
| Demoldability (%) |  | 100 | 100 | 100 | 100 | 100 | 100 | 93 | 100 | 40 | 0 | 10 | 10 | 97 |
| Non-defective ratio (%) |  | 100 | 100 | 100 | 100 | 100 | 100 | 93 | 40 | 40 | 0 | 10 | 10 | 3 |

※ In comparative example 4, order of the second peeling step and the third peeling step is reversed.

AA Example
BB Comparative Example
CC Shape
DD Circular column
EE Octagonal column
FF Pressing force (kgf/cm2)
GG Pressing amount (mm)
HH Shape of pressing surface
II Concave surface
JJ Curvature (mm)
KK Cylinder
LL Diameter (Outer diameter) (mm)
MM Inner diameter (mm)

CONTACT LENS MANUFACTURING METHOD

TECHNICAL FIELD

The present invention relates to a method for removing a contact lens from a mold, the contact lens being produced by cast molding.

BACKGROUND ART

As a contact lens manufacturing method by cast molding, for example, Patent Documents 1 to 5 discloses as follows: a contact lens is obtained in such a way that a mixed monomer liquid containing a base material for a contact lens is injected into a cavity between a concave mold (hereinafter referred to as a "lower mold") and a convex mold (hereinafter referred to as an "upper mold"), produced by an injection molding machine, the resultant is polymerized with light or heat, demolded after polymerization, and inspected and hydrated. In the present specification, a pair of molds obtained by assembling an upper mold and a lower mold with a monomer (to be a contact lens after polymerization) inserted therebetween is referred to as a workpiece.

PRIOR ART DOCUMENT

Patent Document

Patent Document 1 JP 1992-226419 A
Patent Document 2 JP 2003-512206
Patent Document 3 JP 1983-52813 B
Patent Document 4 JP 2008-155504 A
Patent Document 5 JP 2006-150964 A

SUMMARY OF INVENTION

Problems to be Solved by Invention

As a method for removing a contact lens after polymerization, for example, Patent Document 2 discloses as follows: a contact lens is peeled from a workpiece by bringing the workpiece in contact with liquid nitrogen which is an extremely low temperature substance and thus taking advantage of a temperature difference between the workpiece and the contact lens included therein. However, a special chamber and/or equipment is required to bring the extremely low temperature substance in contact with the workpiece, which is not preferable considering the constitution of the equipment and safety of operators.

In addition, as a method for removing a contact lens, after polymerization, in a wet state, for example, Patent Document 3 discloses as follows: a workpiece having a contact lens sticking thereto is left immersed in a methanolic solution for 5 to 10 minutes to allow the contact lens to be spontaneously peeled from the workpiece. However, it is not preferred to apply this method to industrial production line because problem may occur in safety during operation and require a large scaled facility for feeding and/or disposing an organic solution. Moreover, an additional step for drying is required when a contact lens after a demolding step is to be inspected in a dry state. Accordingly, there remains a problem in production cost as well.

Furthermore, as a method for removing a contact lens in a dry state, for example, Patent Document 4 discloses as follows: a lens formation surface of a concave mold retaining a contact lens is placed so as to face downward, while a central part of the non-lens-formation surface which is an opposite side (that is, reverse side, rear side) of the lens formation surface is pressed with a press head from above to allow the contact lens to fall down spontaneously to remove it. However, it cannot be denied that there is a possibility that a contact lens may be deformed although the contact lens is peeled from the concave mold under stress posed onto the non-lens formation surface of the concave mold. Therefore, there is a room for improving probability of removing a contact lens.

Moreover, as a method for removing a contact lens without being damaged, for example, Patent Document 5 discloses as follows: finger-like protruding parts for removing are allowed to move stepwise at different speeds, thereby a contact lens is not damaged during separation of concave and convex molds. However, a special device/mechanism is required for separation of the concave mold and the convex mold. Accordingly, there remains a problem in production cost.

Accordingly, it is a main object of the present invention to provide a method and a device for removing a dry contact lens at high probability without using extensive procedures.

Means to Solve Problems

The present inventors have studied intensively on a method for removing a contact lens produced by cast molding and sticking to a workpiece, in a dry state (preferably without being damaged) at a high probability without using extensive procedures. As a result, the present inventors have found the method described below.

Namely, the present inventors have found that applying pressure onto a non-lens-formation surface of an upper mold tends to create an additional space between a contact lens and the upper mold. Specifically, when a non-lens-formation surface of the upper mold is pressed, a lens-formation surface of the upper mold deforms in the direction to reduce its curvature. On the other hand, a lens-formation surface of a lower mold does not deform. In other words, when stress is transmitted to the mating portion (the site where the upper mold is bonded to the lower mold), a first retainer supporting a flange of the lower mold receives the stress, and the flange of the lower mold deforms in response to the stress, whereas stress transmitted from the upper mold is reduced at the flange of the lower mold, not leading to deformation of the lens-formation surface of the lower mold. In addition, the contact lens relieves the stress originating from the upper mold because of its elasticity. As a result, an additional space is created on a base curve side in contact with the upper mold while no additional space is created on a front curve side in contact with the lower mold. In other words, the contact lens is partially peeled from the upper mold while it still tightly sticks to the lower mold without a gap (a first peeling step described later).

The present inventors have also found that use of a wedge-shaped pawl tends to improve certainty of separation of upper and lower molds from a workpiece. Specifically, an upward taper of an edge applies force so as to push up the lower mold. Simultaneously, a downward taper of an edge applies force so as to push down the upper mold. In other words, both of force to push up the lower mold located above and force to push down the upper mold located below are exerted simultaneously. In addition, mirror symmetrical pawls simultaneously pull the workpiece apart from either sides. This ensures that the upper and lower molds are separated from the workpiece (a separation step described later).

In short, pressure is applied to the non-lens-formation surface of the upper mold before disassembling of the workpiece, and the workpiece is disassembled from the site where the contact lens is partially peeled from the lens-formation surface of the upper mold as a starting point, and then the contact lens is peeled from the upper mold while it still left sticking to the lower mold. Thus, a step of demolding the contact lens sticking to the upper mold is unnecessary. It is possible to pass the lower mold with the contact lens sticking thereto to a second peeling step.

The present inventors have further found that the force required to separate the portion near the periphery of the contact lens tends to be different from the force required to separate the portion near the center of the contact lens.

Thus, periphery portions of the contact lens are firstly peeled off from the lens-formation surface of the lower mold (after the second peeling step described below), and subsequently the remainder which still sticks to the surface is peeled off (a third peeling step described below). In order to peel the periphery portion of the contact lens, a load is applied to crease the non-lens-formation surface of the lower mold. As a result, the lens-formation surface of the lower mold becomes easily deformed (so that a part of the non-lens-formation surface of the lower mold may be inverted to have a reverse curvature). Therefore, as force required to peel off the remainder sticking to the surface, pressing force may be reduced to the extent such that the lens-formation surface of the lower mold deforms.

Briefly speaking, the periphery portion of the contact lens is firstly peeled off. In addition, the force to peel off the periphery portion of the contact lens from the lower mold is applied in a manner different from the manner to apply force to peel off the entire contact lens from the lower mold. Accordingly, the contact lens may be easily demolded (preferably without being damaged).

In this way, the contact lens included in the workpiece can be removed in a dry state (preferably without being damaged) at high probability without using extensive procedures.

Aspects of the present invention created based on the above findings are as follows:

The first aspect of the present invention is a contact lens manufacturing method for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the method including:
(A) a first peeling step of peeling the contact lens from a lens-formation surface of the upper mold;
(B) a separation step of separating the upper mold from the lower mold having the contact lens sticking thereto;
(C) a second peeling step of peeling the periphery portion of the contact lens sticking to the lens-formation surface of the lower mold; and
(D) a third peeling step of peeling the contact lens, the periphery portion of which has been peeled, from the lens-formation surface of the lower mold.

The second aspect of the present invention is the contact lens manufacturing method according to the first aspect, wherein the first peeling step includes a first press head which is a circular column or a polygonal column having a diameter of 5.0 to 10.0 mm and the first press head presses a non-lens-formation surface which is a back surface of the lens-formation surface of the upper mold.

The third aspect of the present invention is the contact lens manufacturing method according to the second aspect, wherein, in the first peeling step, the non-lens-formation surface of the upper mold is directed to a posture directly upward or downward in a vertical direction before being pressed with the first press head.

The forth aspect of the present invention is the contact lens manufacturing method according to any one of the first aspect to the third aspect, wherein the non-lens-formation surface of the upper mold is directed to a posture directly downward in the vertical direction before a pawl is inserted between flanges provided on the lower and upper molds.

The fifth aspect of the present invention is the contact lens manufacturing method according to any one of the first aspect to the forth aspect, wherein the second peeling step includes a second press head whose pressing surface is a concave surface and has a curvature equal to or more than that of the non-lens-formation surface of the lower mold, which is a back surface of the lens-formation surface of the lower mold, and the non-lens-formation surface of the lower mold is pressed with the second press head.

The sixth aspect of the present invention is the contact lens manufacturing method according to the fifth aspect, wherein, in the second peeling step, the non-lens-formation surface of the lower mold is directed to a posture directly upward or downward in the vertical direction before being pressed with the second press head.

The seventh aspect of the present invention is the contact lens manufacturing method according to any one of the first aspect to the sixth aspect, wherein the third peeling step includes a third press head whose pressing surface is a concave surface or a cylinder; and the third press head presses the non-lens-formation surface of the lower mold.

The eighth aspect of the present invention is the contact lens manufacturing method according to the seventh aspect, wherein, in the third peeling step, the non-lens-formation surface of the lower mold is directed to a posture directly upward or downward in the vertical direction before being pressed with the third press head.

The ninth aspect of the present invention is the contact lens manufacturing method according to any one of the first aspect to the eighth aspect, wherein a material of the contact lens is hydrogel or silicone hydrogel.

The tenth aspect of the present invention is a contact lens manufacturing device for removing a contact lens which is produced by polymerizing a monomer included in a pair of molds which are obtained by assembling a lower mold for forming a front curve of the contact lens and an upper mold for forming a base curve of the contact lens, the device including: (A) a first peeling means for peeling the contact lens from a lens formation surface of the upper mold; (B) a separation means for separating the upper mold from the lower mold having the contact lens sticking thereto; (C) a second peeling means for peeling a peripheral portion of the contact lens sticking to the lens formation surface of the lower mold; and (D) a third peeling means for peeling the contact lens, the peripheral portion of which has been peeled, from the lens formation surface of the lower mold.

The eleventh aspect of the present invention is the contact lens manufacturing device according to the tenth aspect, wherein the first peeling means includes a first press head which is a circular column or a polygonal column having a diameter of 5.0 to 10.0 mm.

The twelfth aspect of the present invention is the contact lens manufacturing device according to the tenth aspect or the eleventh aspect, wherein the second peeling means includes a second press head whose pressing surface is a concave surface and a curvature of the concave surface is equal to or more than that of a non-lens-formation surface which is a back surface of the lens formation surface of the lower mold.

The thirteenth aspect of the present invention is the contact lens manufacturing device according to the tenth aspect to the twelfth aspect, wherein the third peeling means includes a third press head which is a concave surface or a cylinder.

The fourteenth aspect of the present invention is the contact lens manufacturing device according to any one of the tenth aspect to the thirteenth aspect, wherein a material of the contact lens is hydrogel or silicone hydrogel.

The fifteenth aspect of the present invention is a method for removing a contact lens from a pair of molds which are obtained by assembling a lower mold for forming a front curve of the contact lens and an upper mold for forming a base curve of the contact lens, the contact lens being produced by polymerizing a monomer included in the pair of molds, the method including:
(A) a first peeling step of peeling the contact lens from a lens-formation surface of the upper mold;
(B) a separation step of separating the upper mold from the lower mold having the contact lens sticking thereto;
(C) a second peeling step of peeling the periphery portion of the contact lens sticking to the lens-formation surface of the lower mold; and
(D) a third peeling step of peeling the contact lens, the periphery portion of which has been peeled, from the lens-formation surface of the lower mold.

The sixteenth aspect of the present invention is a contact lens manufacturing method for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the method including:
a first peeling step of peeling the contact lens from a lens-formation surface of the upper mold while the contact lens remains sticking to the lower mold.

The seventeenth aspect of the present invention is a contact lens manufacturing device for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the device including:
a first peeling means for peeling the contact lens from a lens-formation surface of the upper mold while the contact lens remains sticking to the lower mold.

The eighteenth aspect of the present invention is a jig for separating an upper mold and a lower mold of a pair of molds to remove a contact lens, the pair of molds having been obtained by assembling the lower mold for forming a front curve of the contact lens and the upper mold for forming a base curve of the contact lens, the contact lens being produced by polymerizing a monomer included in the pair of molds, the jig including:
an edge to be inserted as a wedge between a flange of the upper mold and a flange of the lower mold;
a half-arc-like notched portion having a first directly-upward taper formed on a center portion of the edge in an extending direction; and
an end portion having a second directly-downward taper on the portion of the edge excluding the notched portion.

The nineteenth aspect of the present invention is a contact lens manufacturing method for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the method including:
a first peeling step of peeling the contact lens from a lens-formation surface of the upper mold while the contact lens remains sticking to the lower mold; and
a separation step of separating the upper mold from the lower mold having the contact lens sticking thereto.

The twentieth aspect of the present invention is a contact lens manufacturing device for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the device including:
a first peeling means for peeling the contact lens from a lens-formation surface of the upper mold while the contact lens remains sticking to the lower mold; and
a separation means for separating the upper mold from the lower mold having the contact lens sticking thereto.

The twenty first aspect of the present invention is a contact lens manufacturing method for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the method including:
a pre-peeling step of peeling a periphery portion of the contact lens sticking to a lens-formation surface of the lower mold; and
a main peeling step of peeling the contact lens, the periphery portion of which has been peeled, from the lens-formation surface of the lower mold.

The twenty second aspect of the present invention is a contact lens manufacturing device for removing a contact lens from a pair of molds, the contact lens being produced by polymerizing a monomer included in the pair of molds which are obtained by assembling a lower mold for forming a front curve of the contact lens and an upper mold for forming a base curve of the contact lens; the device including:
a pre-peeling means for peeling the periphery portion of the contact lens sticking to a lens-formation surface of the lower mold; and
a main peeling means for peeling the contact lens, the periphery portion of which has been peeled, from the lens-formation surface of the lower mold.

Other aspects of the present invention are characterized in that at least one of the upper mold and the lower mold is made of resin.

It should be noted that a combination of the above aspects may constitute an aspect of the present invention.

Advantageous Effect of the Invention

According to the present invention, a dry contact lens can be removed at high probability without using extensive procedures.

DETAILED DESCRIPTION OF DRAWINGS

FIG. 14 is a diagram illustrating Examples and Comparative Examples.

DETAILED DESCRIPTION OF THE INVENTION

The embodiments of the present invention will be described hereafter, with reference to the drawings. The aforementioned object, characteristics and advantages of the present invention will be more obvious from the detailed description of the embodiments and Examples shown below with reference to the drawings. It should be noted that the present invention is not limited to the following Examples.

The embodiments of the present invention will be illustrated in an order shown below.

In the present specification, "to" means a predetermined value or more and a predetermined value or less.
1. Manufacturing steps of a contact lens
2. Specific contents of the present invention
3. Examples and Comparative Examples
4. Other preferred examples

1. MANUFACTURING STEPS OF A CONTACT LENS

Figure 1:
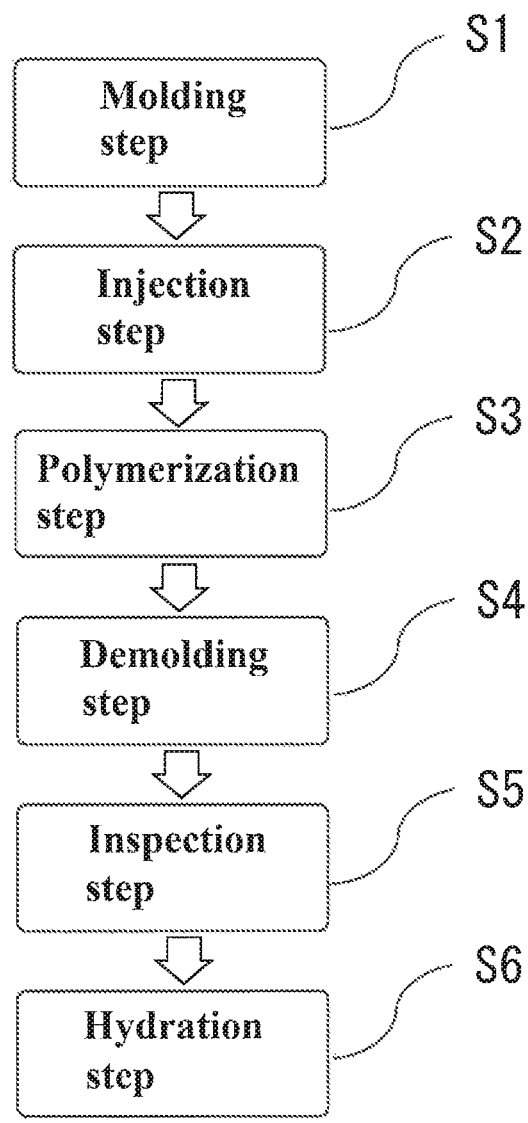
FIG. 1 is a diagram illustrating manufacturing steps of a contact lens.

A manufacturing steps of a contact lens 10 by cast molding will be described, with reference to a step flow shown in FIG. 1. As shown in FIG. 1, a molding step S1, an injection step S2, a polymerization step S3, a demolding step S4, an inspection step S5, and a hydration step S6 are conducted in this order in the manufacturing steps of the contact lens 10. The respective steps will be hereinafter explained. All of these steps are conducted in a clean and dry environment (in a clean room).

(Molding Step: S1)

In the molding step S1, an upper mold 12 (hereinafter referred to as a "base curve mold") and a lower mold 14 (hereinafter referred to as a "front curve mold") to be used for formation of the contact lens 10 are respectively produced using an injection molding machine.

Figure 2:
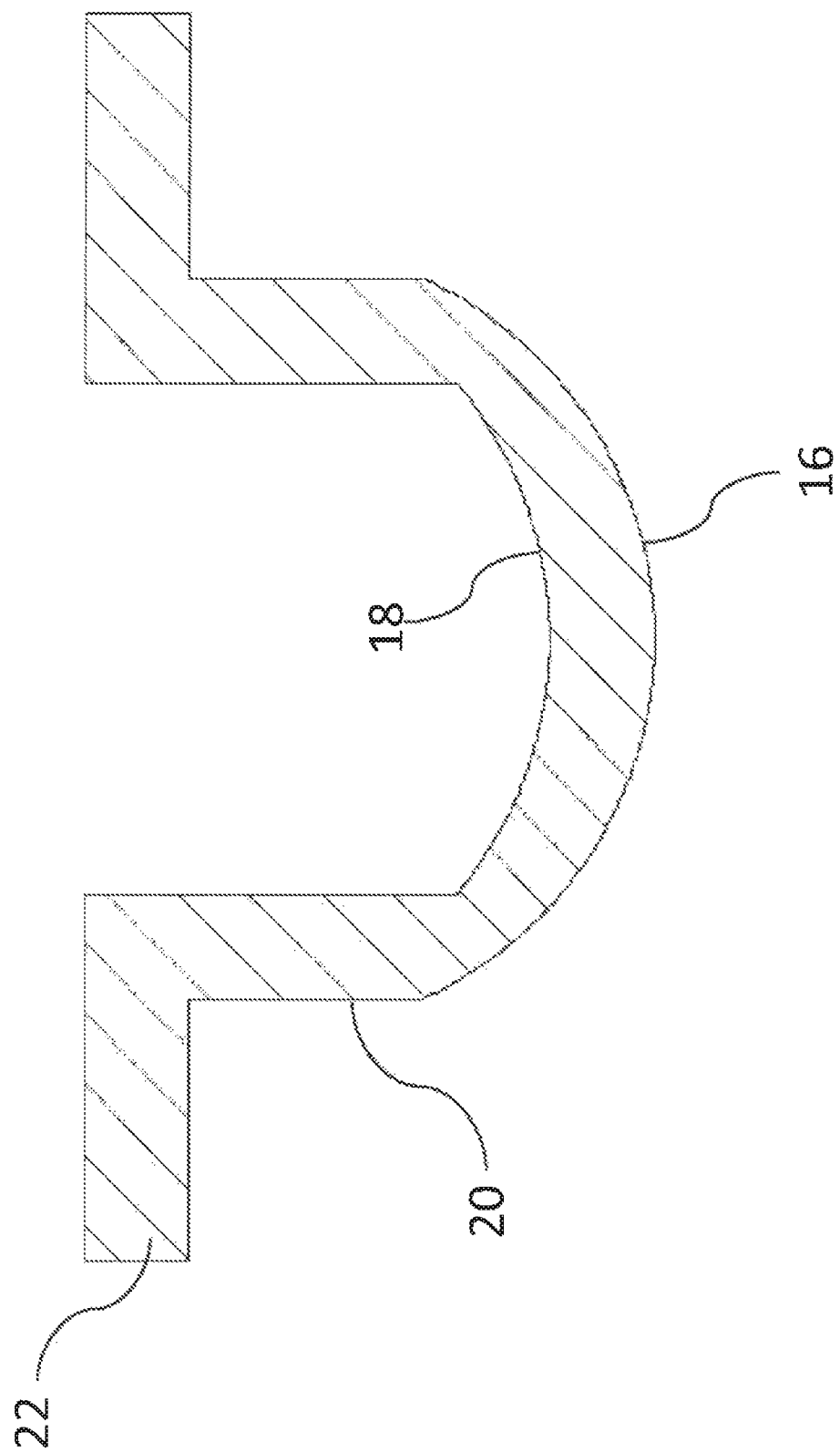
FIG. 2 illustrates an upper mold, and is a sectional side elevation of the upper mold.

A base curve mold 12 shown in FIG. 2 has a first lens formation surface 16 (hereinafter referred to as a "BC formation surface") which forms a base curve of the contact lens 10, and has a first non-lens-formation surface 18 (hereinafter referred to as an "upper mold pressed surface") which is in a spherical form having a predetermined curvature on the rear side (also referred to as a "back surface") of the BC formation surface 16. In addition, a peripheral wall 20 of the upper mold 12 surrounds the BC formation surface 16, and a brim-like flange 22 is provided in a position adjacent to this peripheral wall 20.

Figure 3:
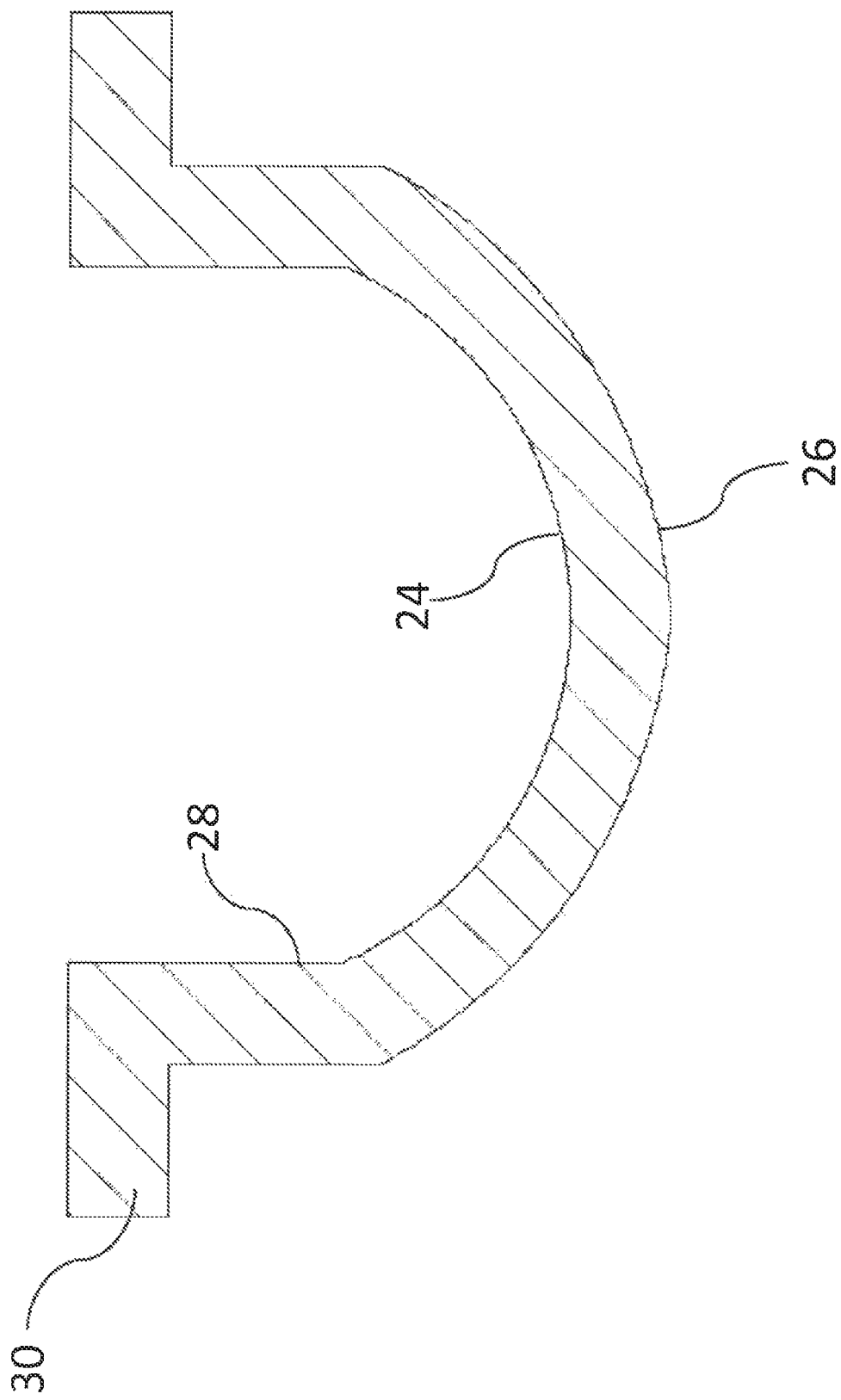
FIG. 3 illustrates a lower mold, and is a sectional side elevation of the lower mold.

A front curve mold 14 shown in FIG. 3 has a second lens formation surface 24 (hereinafter referred to as a "FC formation surface"), which forms a front curve of the contact lens 10, and has a second non-lens-formation surface 26 (hereinafter referred to as a "lower mold pressed surface") which is in a spherical form having a predetermined curvature on the rear side of the FC formation surface 24. In addition, a peripheral wall 28 of the lower mold 14 surrounds the FC formation surface 24, and a brim-like flange 30 is provided in a position adjacent to this peripheral wall 28.

A material for the upper mold 12 and the lower mold 14 may be any one which is superior, for example, in solvent resistance and mechanical properties compared to a monomer 32 (explained below). In addition, the material may be any one which enables the upper mold 12 and/or the lower mold 14 to be partially deformed in the demolding step S4 explained below. Considering the foregoing, a resin is used as the material in the present embodiment. As such resin, for example, polypropylene, polyethylene, polyethylene terephthalate, polymethylpentene, polysulphone, polyphenylene sulfide, cyclic olefin copolymers and ethylene vinyl alcohol copolymers are preferred. Particularly, polypropylene is preferred.

(Injection Step: S2)

Figure 4:
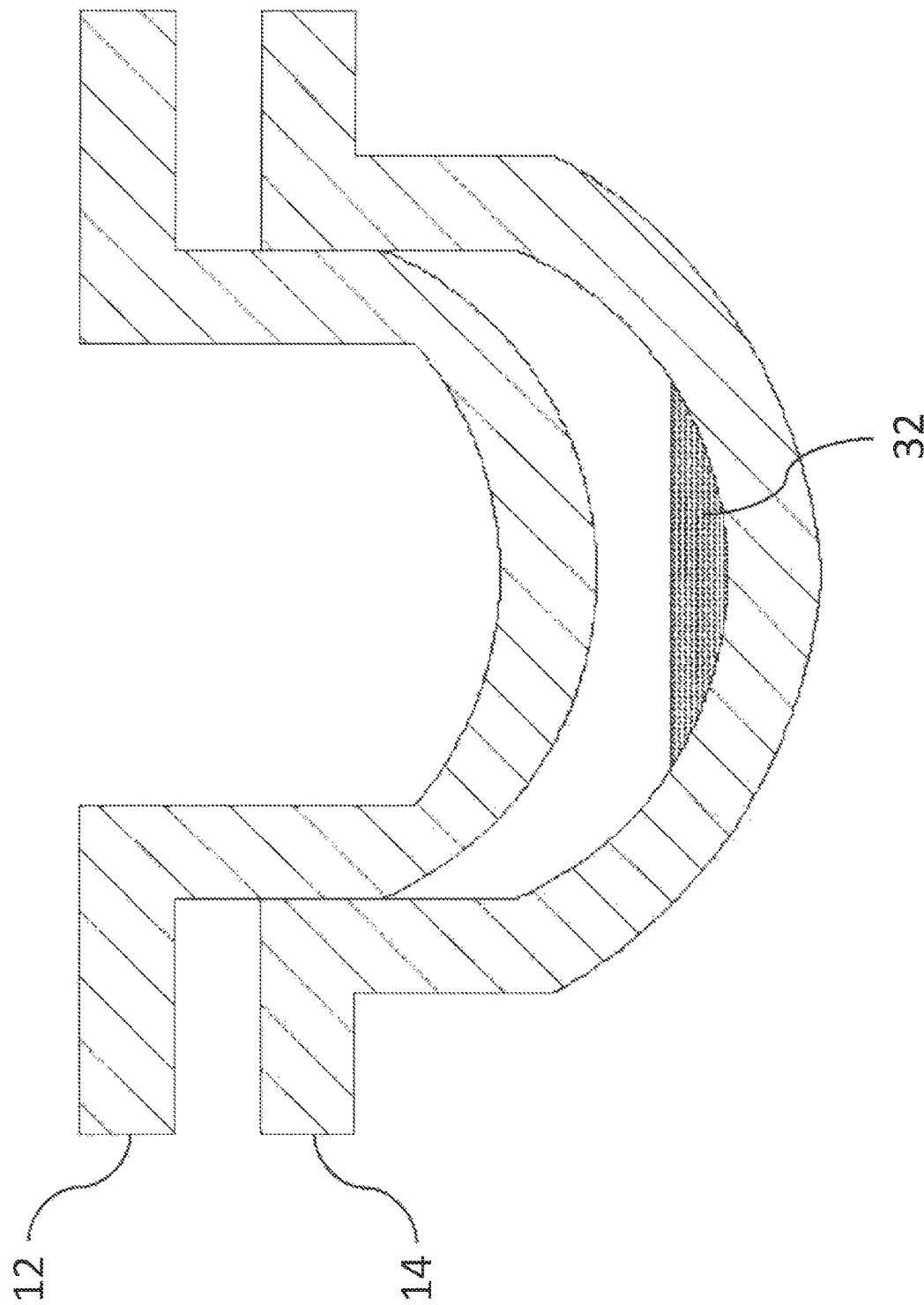
FIG. 4 illustrates a workpiece, and is a sectional side elevation of upper and lower molds in the middle of assembling.
Figure 5:
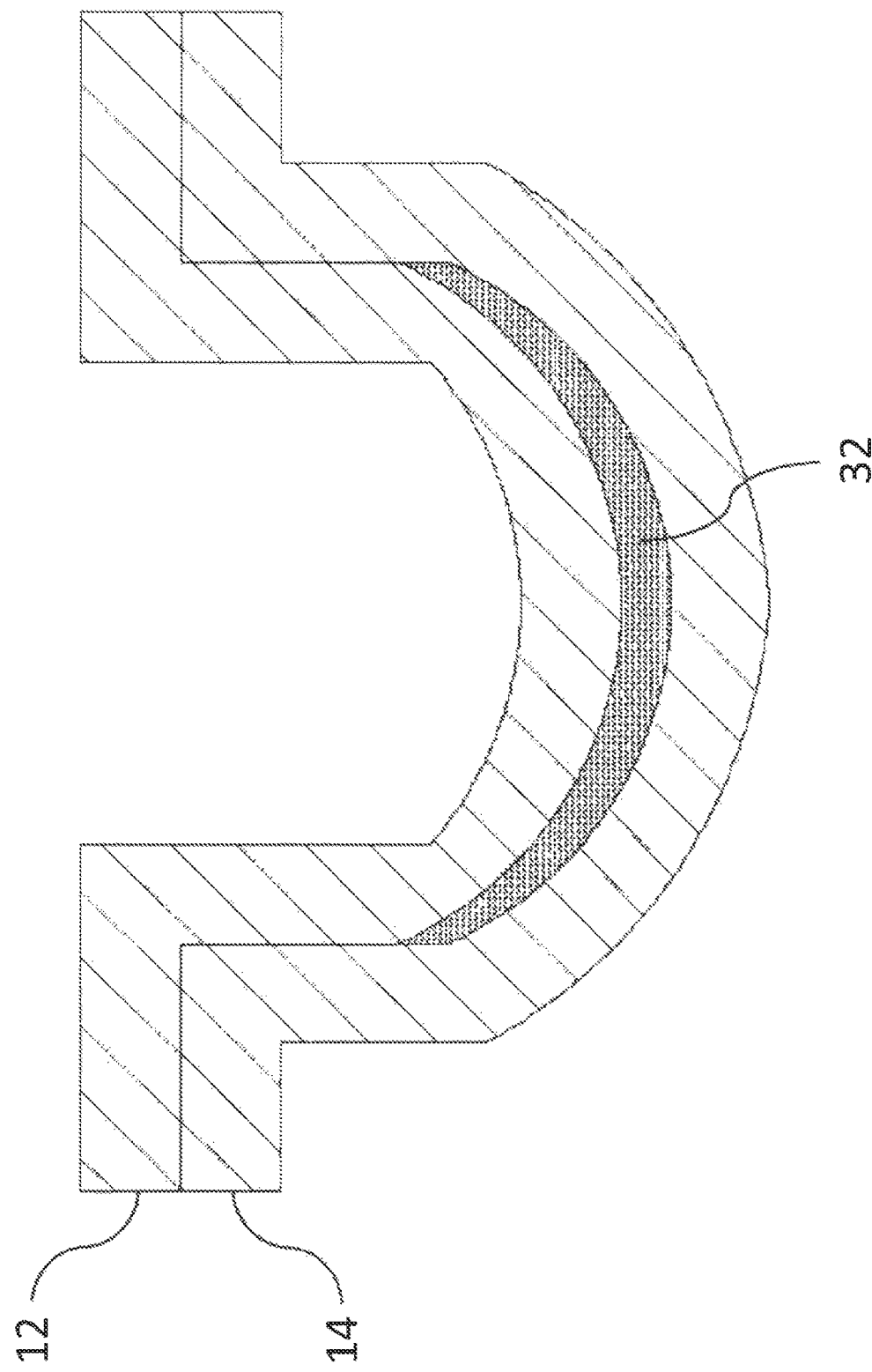
FIG. 5 illustrates a workpiece, and is a sectional side elevation of upper and lower molds after assembling.

In the injection step S2, a monomer mixed liquid 32 (hereinafter also referred to as a "monomer") containing a base material for the contact lens is poured in the lower mold 14 prepared in the molding step S1, and then the upper mold 12 is assembled with the lower mold 14 from directly above. Specifically, the state shown in FIG. 4 is shifted to the state shown in FIG. 5. In the description below, as illustrated in FIG. 5, an assembly of the upper mold 12 and the lower mold 14 including the monomer 32 in a space between the upper mold 12 and the lower mold 14 is referred to as a workpiece 34. It should be noted that "directly above" means the direction toward a ceiling in a clean room (that is, toward sky, upside), and "directly below" means the direction toward a floor in the clean room (that is, toward ground, downside). Hereinafter, regarding the vertical direction, the foregoing applies unless otherwise specified.

A base material for the contact lens may be any polymer which may retain the form of the contact lens after polymerization and may become a hydrogel, preferably a copolymer which may contain silicone and become hydrogel. Those conventionally known as base materials for a soft contact lens may be used as they are. A base material for the contact lens preferably contains: (a) a silicone monomer having at least one (meth)acryloyl group; (b) a hydrophilic monomer having at least one vinyl group; (c) at least one cross-linkable monomer; and (d) at least one polymerization initiator; wherein the silicone monomer (a) is preferably a silicone monomer having 1 to 4 silicon atoms and at least one hydroxyl or polyethylene glycol group in a molecule.

Such a silicone monomer may be one or two or more silicone monomers containing at least one hydroxyl group and 1 to 4 silicon atoms in a molecule (hereinafter referred to as "(a1)"), or one or two or more silicone monomers containing at least one polyethylene glycol group and 1 to 4 silicon atoms in a molecule (hereinafter referred to as "(a2)"), as described in the specification of U.S. Pat. No. 5,452,756. Examples of the silicone monomer (a1) include the following general formula (a1-1) and (a1-2).

[Chem. 1]

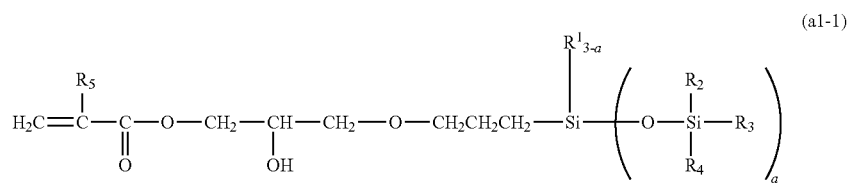

(a1-1)

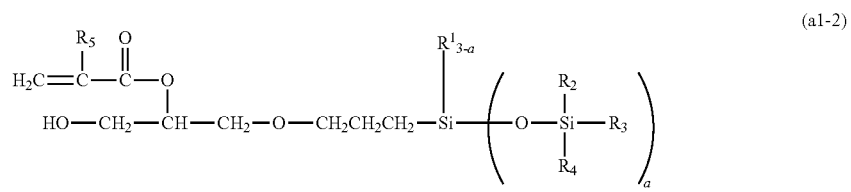

(a1-2)

(wherein R1, R2, R3 and R4 each represents a methyl group, R5 represents a hydrogen atom or a methyl group, and a represents an integer of 1 to 3).

In addition, examples of the silicone monomer (a2) includes the following general formula (a2-1):

[Chem. 2]

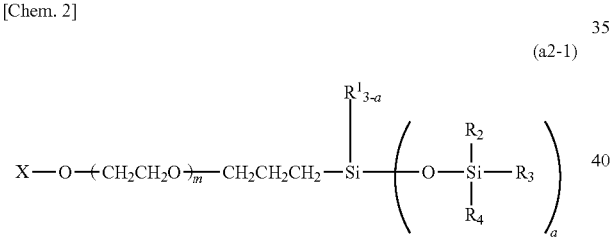

(a2-1)

[wherein, R1, R2, R3, and R4 each represents a methyl group, a represents an integer of 1 to 3, m represents 4 to 8, X represents any one selected from the substituent represented by the following formula (Y1) or (Y2) (wherein, R5 represents a hydrogen atom or a methyl group)].

[Chem. 3]

(Y1)

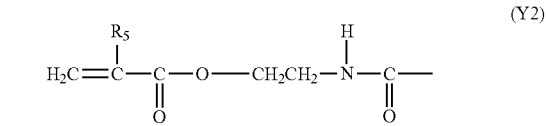

(Y2)

It should be noted that the silicone monomer (a1) or (a2) may also be represented, for example, by the following general formula (I):

[Chem. 4]

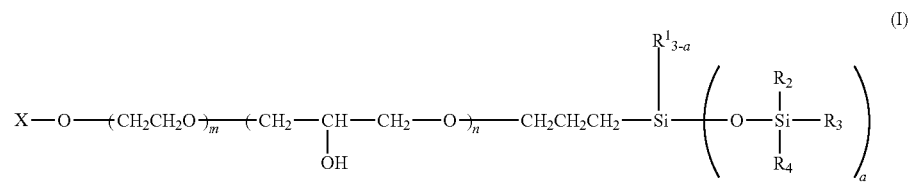

(I)

[wherein, R1, R2, R3, and R4 each represents a methyl group, a represents an integer of 1 to 3, n is 0 or 1, m represents 0 or 4 to 8; provided that when n is 1, m is 0, and when n is 0, m is 4 to 8 (an average of a repetition number); wherein X is one selected from substituents represented by formulas (Y1) to (Y2)].

(Polymerization Step: S3)

In polymerization step S3, as described above, a monomer 32 filled in the workpiece 34 is polymerized. Specifically, a monomer 32 in the workpiece 34 is heated or irradiated with light (UV and/or visible light) to polymerize the monomer 32. In this way, the monomer 32 is polymerized to generate the contact lens 10 in the workpiece. In the present embodiment, the monomer 32 filled in the workpiece 34 is polymerized (thermally polymerized) with a polymerization furnace to cure the monomer 32.

(Demolding Step: S4)

In a demolding step S4, the workpiece 34 after polymerization of the monomer 32 in the polymerization step S3 has been completed is separated into the upper mold 12 and the lower mold 14, thus the contact lens 10 is removed. The demolding step S4 will be illustrated in detail below.

(Inspection Step: S5)

In an inspection step S5, the contact lens 10 removed in the demolding step S4 is collected, and determined whether non-defective or defective according to an automatic inspection and/or semi-automatic inspection using inspection equipment.

(Hydration Step: S6)

In a hydration step S6, the contact lens determined to be a good conforming product in the inspection step S5 is swollen. After that, it is sterilized, packed and then shipped.

2. SPECIFIC CONTENTS OF THE PRESENT INVENTION

The demolding step S4 is composed of a first peeling step s1, a separation step s2, a second peeling step s3, and a third peeling step s4.

(First Peeling Step s1)

Figure 6:
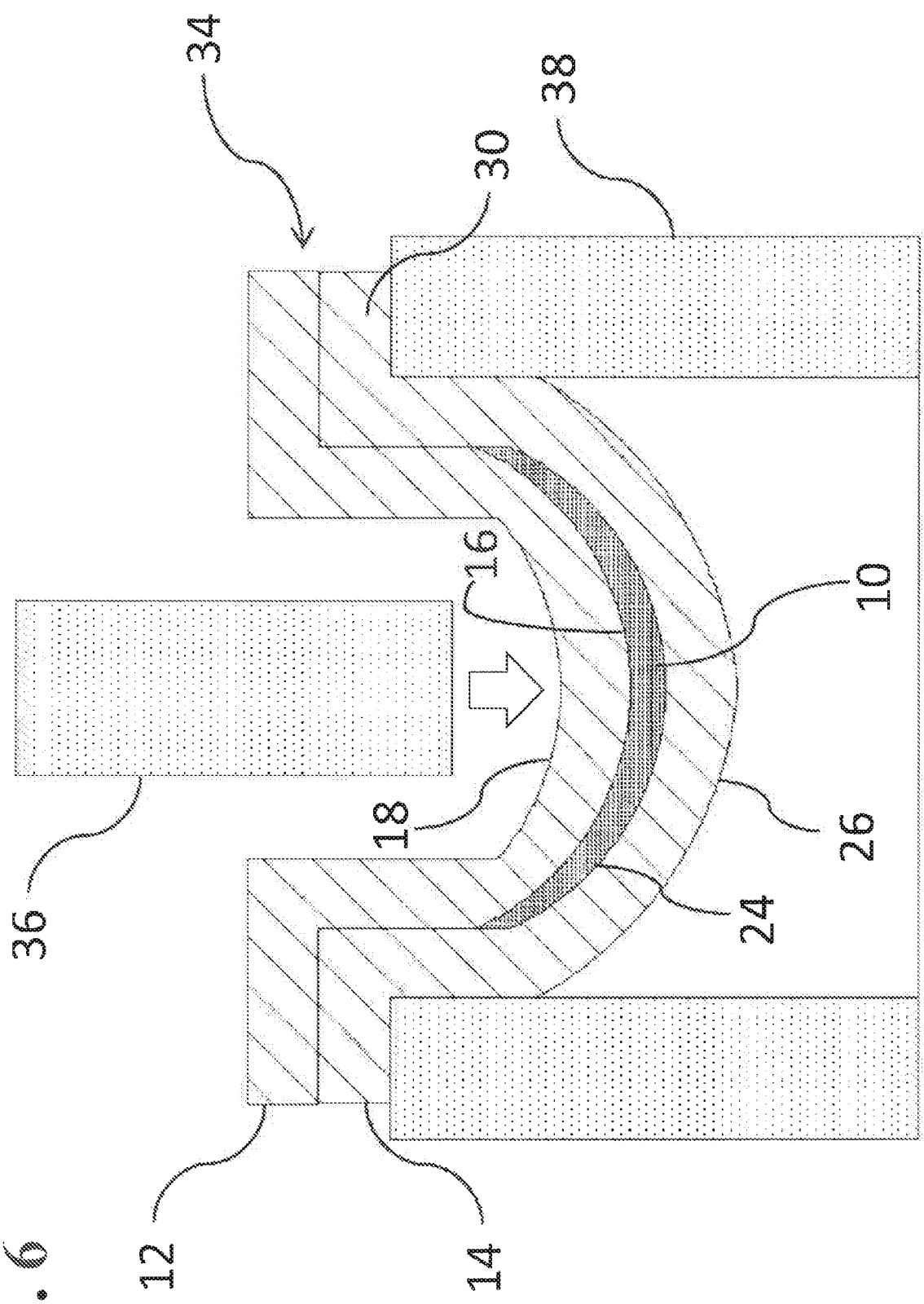
FIG. 6 is a sectional side elevation illustrating a first peeling step.

The first peeling step s1 is aimed at partially peeling the contact lens 10 from the upper mold 12 (preferably without being damaged). In this first peeling step s1, the first press head 36 (also referred to as a first peeling means, an upper mold peeling means, an upper mold press head; "First peeling" may be replaced with "upper mold peeling") is used to press the upper mold pressed surface 18, as shown in FIG. 6.

A first press head 36 may be of any form so long as it can create an additional space between the contact lens 10 and the upper mold 12. In other words, it may be of any form so long as it can partially peel the contact lens 10 from the upper mold 12 (preferably without being damaged). For example, a pressing surface of the first press head 36 (i.e., a surface on which the first press head 36 is in contact with the upper mold pressed surface 18, shown in FIG. 6; the similar explanation will be hereinafter omitted) is preferably flat. It is also preferable that a side face of the first press head 36 (in FIG. 6, the "side face" of the first press head 36 faces the front; the similar explanation will be hereinafter omitted) is a circular column or a polygonal column. It should be noted that a diameter of an octagonal column, as an example of the polygonal column, corresponds to a line connecting an apex to another apex along a diagonal line (i.e., a diameter of a circumcircle of the octagon). Hereinafter, this definition applies to other polygons.

A diameter of the first press head is preferably in the range of 5.0 to 10.0 mm (more preferably 7.0 to 10.0 mm, still more preferably 7.0 to 9.0 mm).

A material of the first press head 36 may be any one which is excellent in stiffness and resistance to abrasion. For example, it may be brass, stainless steel, cemented carbide, or reinforced plastic, and is preferably stainless steel. A material of pawls 40, 42, the second press head 66, and the third press head 72, described below, is similar to those described for the first press head 36.

Pressing force of the first press head 36 is such that the contact lens 10 can be partially peeled from the upper mold 12 (preferably without being damaged). Preferably, the force is in the range of 180 to 220 kgf/cm$^2$, more preferably 200 kgf/cm$^2$.

The pressing amount of the first press head 36 may be such that the contact lens 10 may be partially peeled from the upper mold 12 (preferably without being damaged). Preferably, it is within the range of 0.3 to 0.4 mm, more preferably 0.35 mm. The pressing amount of less than 0.3 mm increases the probability of the contact lens 10 to adhere the upper mold 12 during the separation step s2. The pressing amount of more than 0.4 mm renders the workpiece 34 more easily to be damaged. In other words, the pressing amount of 0.35 mm makes the best balance of two conflicting conditions, i.e., not to damage the workpiece 34 and to create an additional space between the contact lens 10 and the upper mold 12.

A pressing amount of the first press head 36 means a movement distance of the workpiece since the first press head 36 is brought in contact with the upper mold pressed surface 18 till the first press head pushes down the workpiece 34. Further, this definition of the pressing amount of the first press head applies to the definitions of a pressing amount of the second press head 66 and a pressing amount of the third press head 72.

The workpiece 34 is fixed by the first retainer 38. This first retainer 38 may be of any form so long as it may retain clearance considering workability while maintaining the posture of the workpiece 34. For example, it is possible to fix the workpiece 34 while an upper mold pressed surface 18 facing directly upward in the vertical direction (that is, a BC formation surface 16 facing directly downward, see, FIG. 6), or to fix the workpiece 34 while the upper mold pressed surface 18 facing directly downward (i.e., the BC formation surface 16 facing directly upward; not shown).

Examples of the first retainer 38 include, for example, a pedestal, an aspiration tube, and a rail. Preferably, it is a flat pedestal in the form of a circular or polygonal tube, more preferably a flat cylindrical pedestal. The first retainer 38 having too large clearance fails to adjust centering of the workpiece 34. Meanwhile, the first retainer 38 having too small clearance impairs workability during placing/removing the workpiece.

The first press head 36 presses the upper mold pressed surface 18 from directly above to directly below in the vertical direction of the workpiece 34 fixed on a first retainer 38, as shown by a blank arrow in FIG. 6. At the time of pressing, it is preferred to coincide the central position of the upper mold pressed surface 18 in a planar view (that is, taking FIG. 6 as the side view, seen from the direction perpendicular to the side view) with the central position of the pressing surface of the first press head 36 (centering). In this step, the center of the upper mold pressed surface 18 is pressed as described above. Unless otherwise specified, the portion to be pressed is as described above.

When the upper mold pressed surface 18 is pressed, stress is applied to the BC formation surface 16, resulting in deformation in the direction to decrease a curvature of the BC formation surface 16. On the other hand, the FC formation surface 24 does not deform. Namely, when a stress is applied to a mating portion (where the upper mold 12 is in contact with the lower mold), the first retainer 38 supporting a flange 30 receives a stress transmitted to the lower mold 14. As a result, the flange 30 deforms in response to the stress, while the stress is attenuated by the flange, not leading to the deformation of a lens FC surface 24. In addition, the contact lens may reduce the stress transmitted from the upper mold 12 to a certain degree because of its elasticity.

As a result, an additional space is created on the base curve side of the contact lens 10 in contact with the upper mold 12, while no additional space is created on the front curve side of the contact lens 10 in contact with the lower mold 14. In other words, the contact lens 10 is partially peeled from the BC formation surface 16, while the contact lens 10 remains tightly sticking to the FC formation surface 24 without a gap.

(Separation Step s2)

Figure 7:
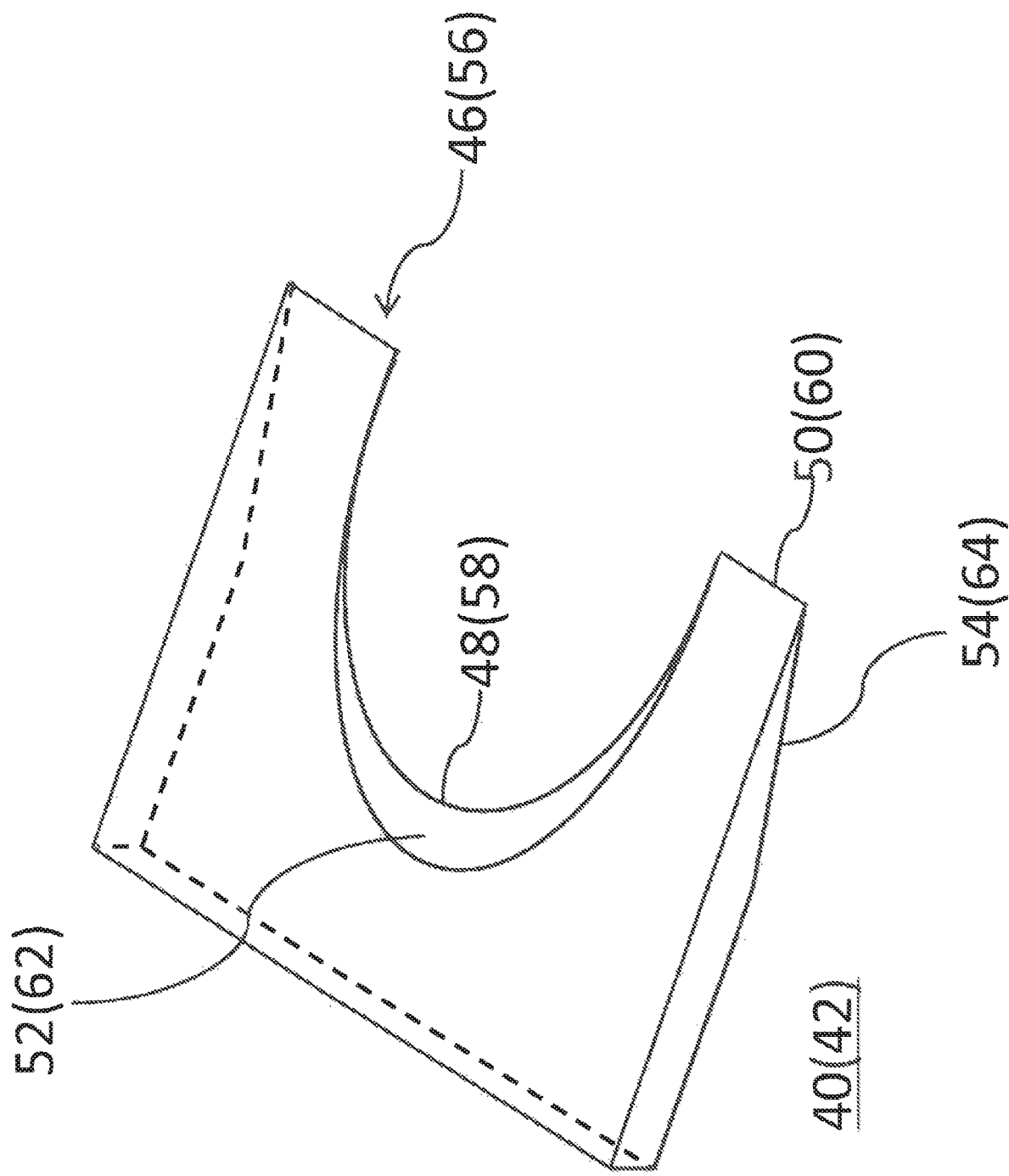
FIG. 7 is a diagram illustrating a pawl, and is a perspective view of the pawl.
Figure 8:
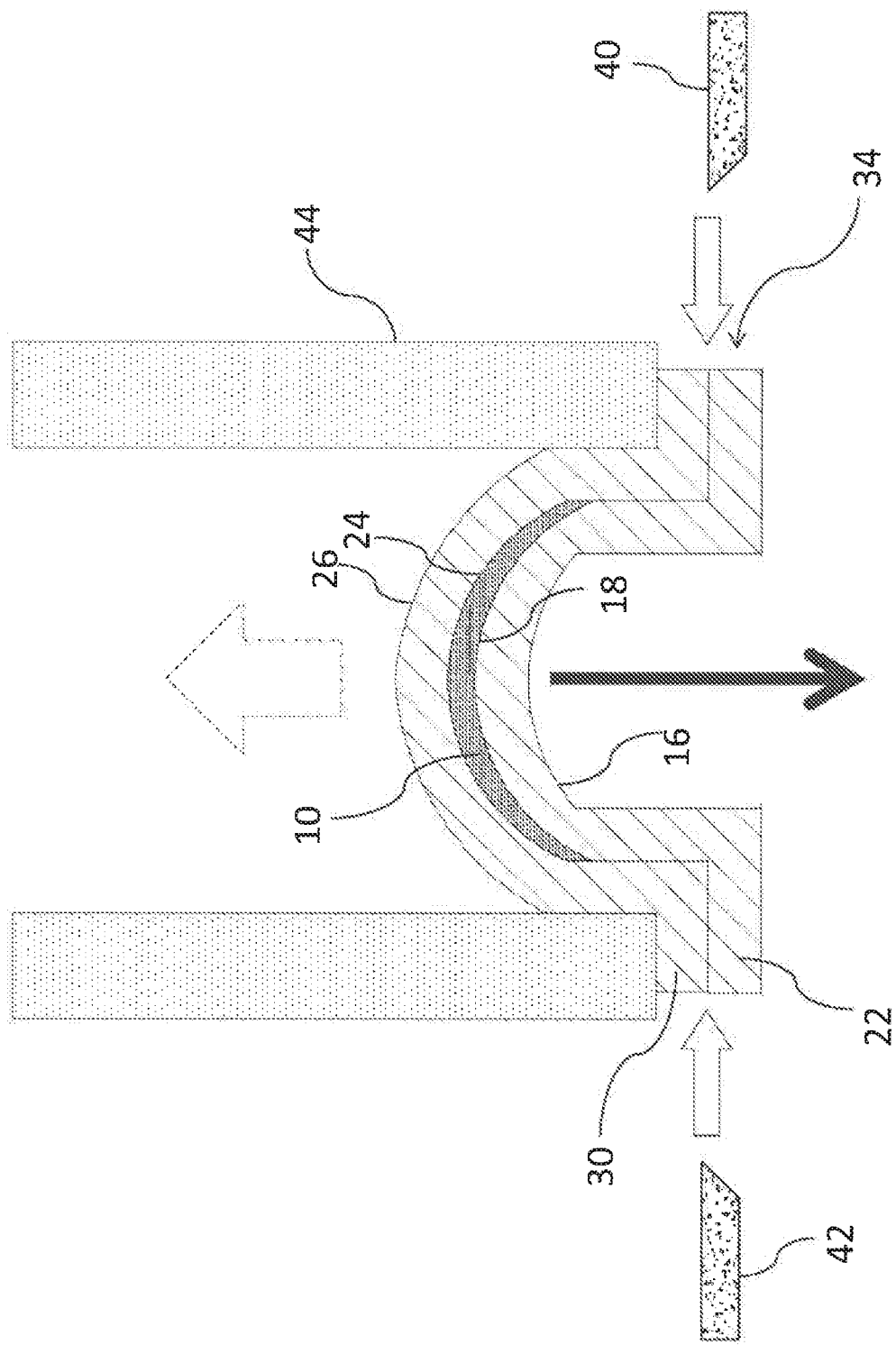
FIG. 8 is a sectional side elevation illustrating a separation step.

The separation step s2 is aimed at separating the workpiece 34 into the upper mold 12 and the lower mold 14. During the separation step s2, separation is conducted using the pawls 40, 42 (separation means). FIG. 7 shows the pawls 40, 42, and FIG. 8 shows a state of the separation step s2.

The pawl 40 has a portion which is composed of opposing upper and lower surfaces and to be inserted as a wedge (that is, an edge 46). A half-circle-like (half-arc) notch 48 is provided at the central portion in the extending direction of this edge 46, and an end portion 50 is provided in the edge 46 excluding the notch 48.

The notch 48 has a form which can be inserted between the flange 22 of the upper mold 12 and the flange 30 of the lower mold 14. For the purpose, the form of the notch 48 may be appropriately adjusted depending on the form in a planar view of the workpiece 34. In addition, the notch 48 preferably has a first directly upward taper 52 formed thereon, whereby the workpiece 34 may be easily separated into the upper mold 12 and the lower mold 14. An edge 50 has preferably a second directly downward taper 54 formed thereon, whereby the workpiece 34 may be easily separated into the upper mold 12 and the lower mold 14. It should be noted that the first taper 52 may be directly downward, and the second taper 54 may be directly upward.

The pawl 42 has the similar shape as that of the pawl 40, and also has a notch 58, an end portion 60, a first taper 62, and a second taper 64. Namely, the shape of the pawl 42 is mirror symmetric to that of the pawl 40 (mirror symmetric, with the edge 46 of the pawl 40 facing the edge 56 of the pawl 42).

In this case, a synergistic effect may be exerted by combining the first taper 52 and the second taper 54. Specifically, when the pawl 40 is inserted into the workpiece 34 (between the flange 22 and the flange 30), force to push up the lower mold 14 located on the upper part of the workpiece 34 is exerted by the first taper 52. In addition, a force to push down the upper mold 12 located on the lower part of the workpiece 34 is exerted by the second taper 54. Namely, a force to push up the lower mold 14 located on the upper part and a force to push down the upper mold 12 located on the lower part are exerted simultaneously, enabling the workpiece 34 to be easily separated into the upper mold 12 and the lower mold 14, improving a lower mold retention ability (described later).

The second retainer 44 aspirates in the direction shown by a dotted-and-dashed arrow in FIG. 8. The second retainer 44 may be of any form so long as it may maintain the posture of the upper mold pressed surface 18 facing directly downward (i.e., the lower mold 14 is arranged directly above, and the upper mold is arranged directly below) and may have a clearance considering a workability. For example, an aspiration tube and a rail are mentioned. Preferably, it is an aspiration tube having a cylindrical or polygonal tube shape. A cylindrical aspiration tube is more preferred. It should be noted that a second retainer 44 having too large clearance fails in successful centering of the workpiece 34. Meanwhile, the second retainer 44 having too small clearance results in impaired workability for fitting/removal of the workpiece 34.

A posture of the workpiece 34 is maintained with the lower mold being located above and the upper mold being located below by aspiration by the second retainer 44. Into a gap between the flanges 22 and 30 facing parallel to each other, the pawl 40 is inserted from a right side in parallel to the flange 30, and the pawl 42 is inserted from a left side in parallel to the flange 30. At this time, the end portions 50, 60 are in vicinity with each other, and the notches 48, 58 are also in vicinity with each other. The pawls 40, 42 are inserted in each half from either side in the horizontal direction at the same time, allowing the pawls 40, 42 to enter between the flanges 22 and 30 at the same time. Thus, force to disassemble the workpiece 34 into the upper mold 12 and the lower mold 14 is distributed equally in horizontal direction. Therefore, the workpiece 34 is not inclined. Upon completion of insertion, force is applied to the pawls 40, 42 in the direction perpendicular to the flanges 22, 30 to pull them apart. The contact lens 10 is peeled from the upper mold 12 and left on the lower mold 14. The upper mold spontaneously falls downward. It should be noted that, at the time of separation, the pawls 40, 42 are preferably inserted in a gap between the flanges 22 and 30 simultaneously in parallel to each other.

In this way, mirror symmetrical pawls 40, 42 are inserted in the gap between the flanges 22, 30 in parallel to each other simultaneously. In addition, a force to push up is applied to the flange 30 by the first tapers 52, 62, and a force to push down is applied to the flange 22 by the second tapers 54, 64. In addition, the pawls 40, 42 pull apart the workpiece 34 in the direction perpendicular to the flanges 22, 30. Accordingly, the upper mold 12 and the lower mold 14 are ensured to be separated from the workpiece 34.

In addition, pressure is applied to the upper mold pressed surface 18 before disassembling of the workpiece 34, and the workpiece 34 is disassembled from the site where the contact lens 10 is partially peeled from the BC-formation surface 16 of the upper mold as a starting point, and then the contact lens 10 is peeled from the upper mold 12 while it still remains sticking to the lower mold 14. As a result, a step of demolding the contact lens 10 sticking to the upper mold 12 is unnecessary. The lower mold having the contact lens 10 sticking thereto can be passed to the subsequent second peeling step s3.

(Second Peeling Step s3)

Figure 9:
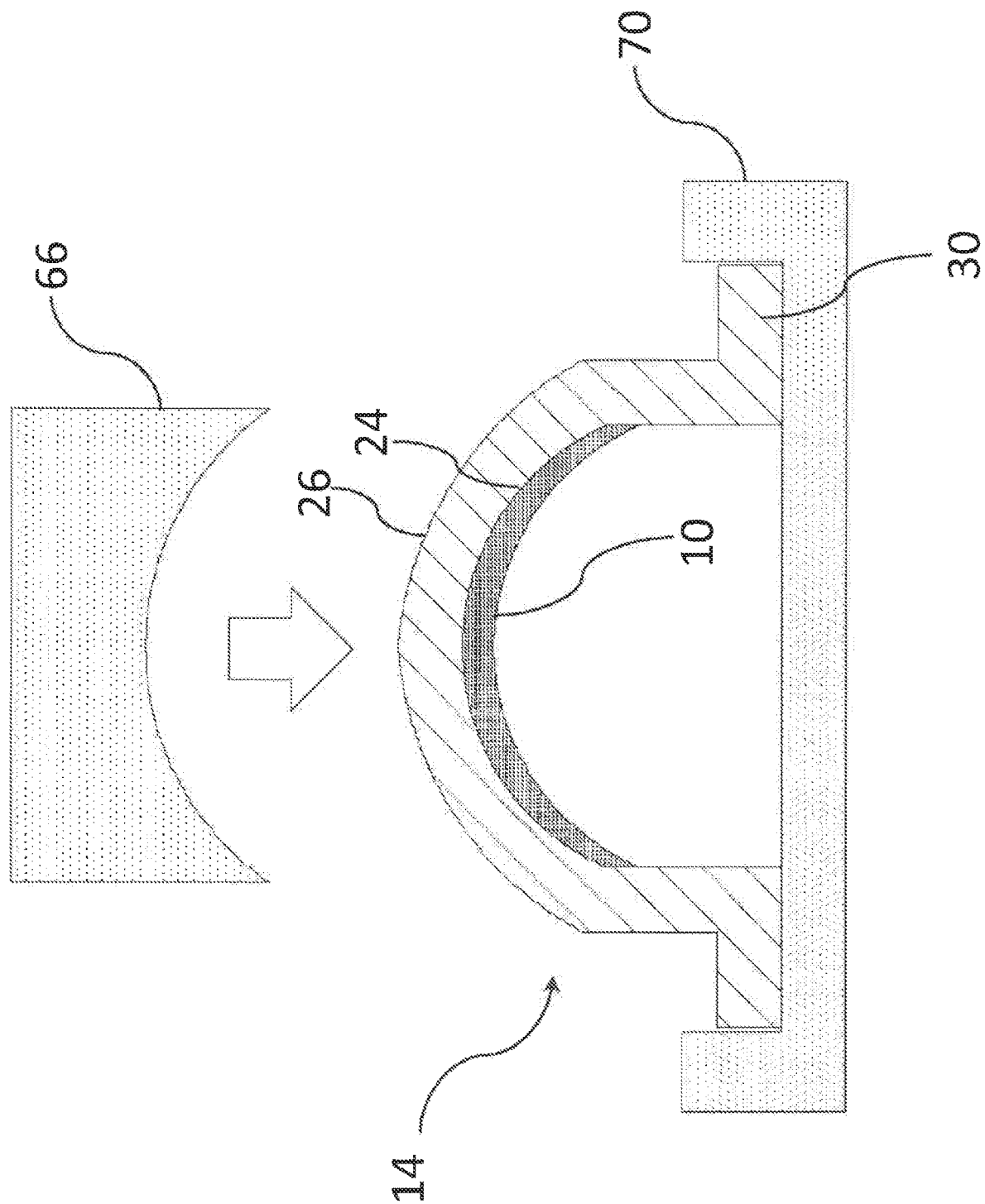
FIG. 9 is a diagram illustrating a second peeling step, and is a sectional side elevation showing a condition before being subjected to the second peeling step.

The second peeling step s3 is aimed at peeling the periphery portion of the contact lens 10 sticking to the lower mold 14 after the upper mold 12 has been separated. In the second peeling step s3, the second press head 66 (also referred to as a second peeling means, a lower-mold pre-peeling means, or first lower-mold press head; it should be noted that the term "second peeling" may be replaced with "lower-mold pre-peeling") may be used to press the lower mold pressed surface 26. The state is shown in FIG. 9 (before pressing) and FIG. 19 (during pressing).

A second press head 66 may be of any form so long as the periphery portion of the contact lens 10 may be peeled from the FC formation surface 24. In other words, it may be of any form so long as it can apply load so as to make a crease 68 in the periphery portion of the lower mold pressed surface 26, preferably without being damaged. For example, a pressing surface of the second press head 66 (a surface on which the second press head 66 shown in FIG. 9 is in contact with the lower mold pressed surface 26, similar explanation will be hereinafter omitted) is preferably a concave surface having a curvature equal to or more than that of the lower mold pressed surface 26, or a multi-staged concave surface formed to have a plurality of curvatures decreasing stepwise toward the center of a pressing surface of the second press head 66. In addition, a side face of the second press head 66 (in FIG. 9, the side face of the second press head 66 faces the front, similar explanation will be hereinafter omitted) is preferably set to be a circular column.

A curvature of the second press head 66 is preferably 9.0 to 9.5 mm, more preferably 9.0 mm. A diameter of the second press head 66 is preferably 9.0 to 14.0 mm, more preferably 9.7 to 13.3 mm.

A pressing force of the second press head is preferably such that an FC formation surface 24 may be peeled from the periphery of the contact lens 10, such that a load may be applied so as to make a crease in the periphery portion of the lower mold pressed surface 26, preferably without damaging the contact lens 10. Preferably, it is within the range of 180 to 220 kgf/cm$^2$, and more preferably 200 kgf/cm$^2$.

A pressing amount of the second press head 66 is preferably such that a load is applied so as to make a crease in the periphery portion of the lower mold pressed surface 26 without damaging the contact lens 10. Preferably, it is within a range from 1.5 to 2.0 mm, and more preferably 1.7 mm. A pressing amount less than 1.5 mm will decrease the percentage of the periphery portion of the contact lens peeled upon pressing with the second press head, while the pressing amount more than 2.0 mm will render the lower mold 14 more easily to be damaged. In other words, the pressing amount of 1.7 mm has the best balance of the two conflicting conditions, i.e., not to damage the lower mold 14 and to peel the periphery portion of the contact lens 10 from the lower mold 14.

A crease 68 indicates a line (crease line) which may become a starting point of the deformation of a convex-shaped lower mold pressed surface 26 under pressing in a third pressing step s4 described below. Specifically, a circular impression may be formed. It should be noted that the impression may not be circular.

The lower mold 14 is fixed by a third retainer 70. The third retainer 70 may be of any form so long as it may maintain a clearance considering a workability while maintaining the posture of the lower mold 14. For example, it is possible to fix the lower mold in the posture where the lower mold pressed surface 26 faces directly upward in the vertical direction (i.e., FC formation surface 24 facing directly downward; see, FIG. 9), or it is possible to fix the lower mold in the posture where the lower mold pressed surface 26 faces directly downward in the vertical direction (i.e., FC formation surface 24 facing directly upward, not shown).

Examples of the third retainer 70 include, for example, a pedestal, an aspiration tube, and a rail. A flat pedestal whose peripheral wall is a circular or polygonal peripheral wall or a groove in which the flange 30 is fit is preferred. A flat cylindrical pedestal (that is, a mounting surface of the lower mold is flat and a peripheral wall is circular) is more preferred. When the third retainer 70 has too large clearance, centering of the lower mold 14 is not attained. Meanwhile, when the third retainer 70 has too small clearance, workability in placing/removing the lower mold 14 is impaired.

Figure 10:
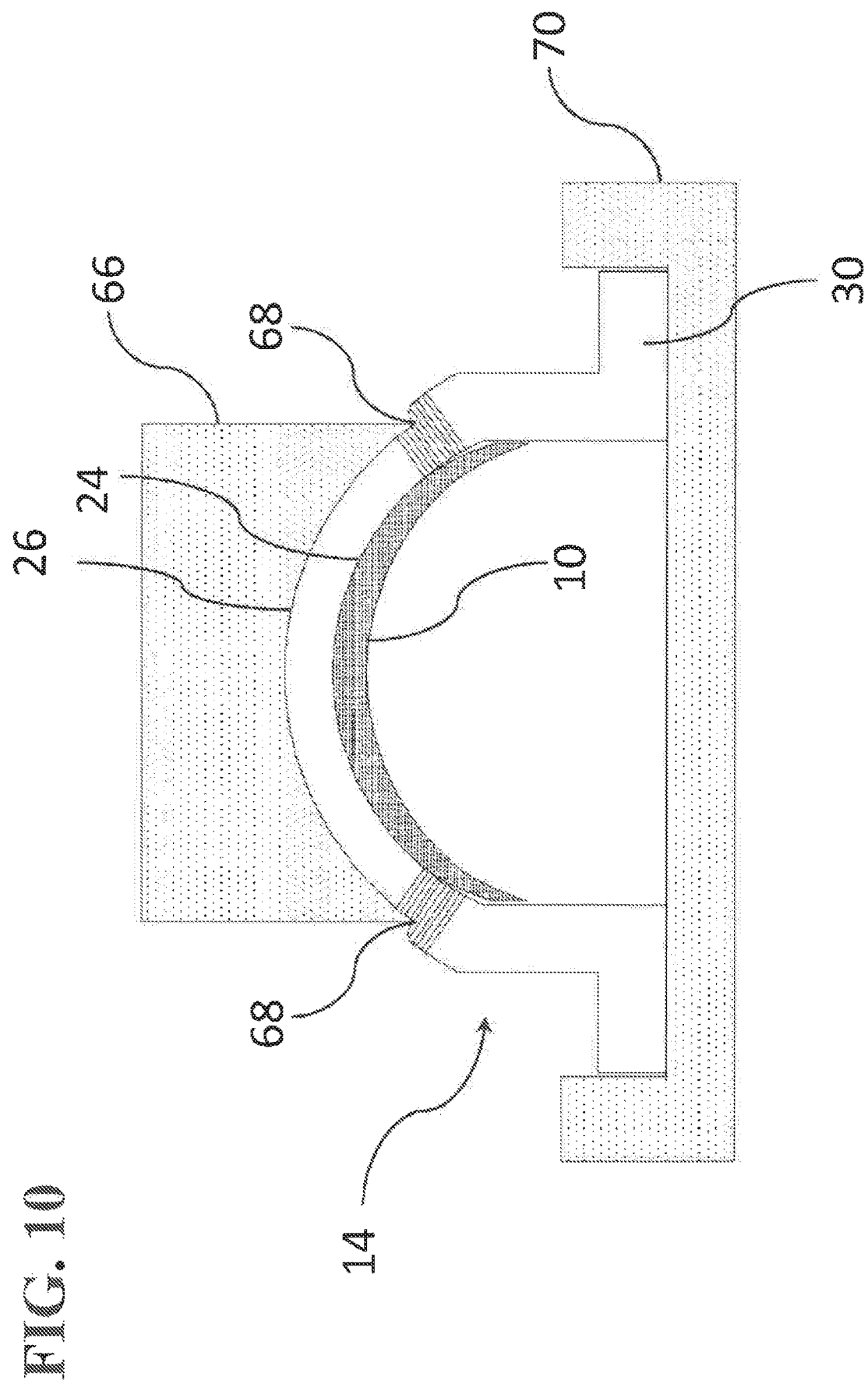
FIG. 10 is a diagram illustrating a second peeling step, and is a sectional side elevation showing a state where the lower mold is pressed with a second press head.

Shifting FIG. 9 to FIG. 10, the second press head 66 presses the lower mold pressed surface 26 from directly above to directly below in the vertical direction of the lower mold 14 fixed on the third retainer 70. At this time, a load is applied to the periphery portion of the lower mold 14 to make the crease 68 therein. When a stress is applied to the FC formation surface 24 upon pressing to the lower mold pressed surface 26, the FC formation surface 24 deforms in the direction so as to increase its curvature, peeling the periphery portion of the contact lens 10 from the FC formation surface 24. At the time of pressing, it is preferred to coincide the central position of the lower mold pressed surface 26 in a planar view (that is, taking FIG. 9 as a side view seen from the direction perpendicular to the side view, similar explanation will be hereinafter omitted) with the central position of the pressing surface of the second press head 66 (centering). In this step, the center of the lower mold pressed surface 26 is pressed as described above. Unless otherwise specified, the portion to be pressed is as described above.

(Third Peeling Step s4)

Figure 11:
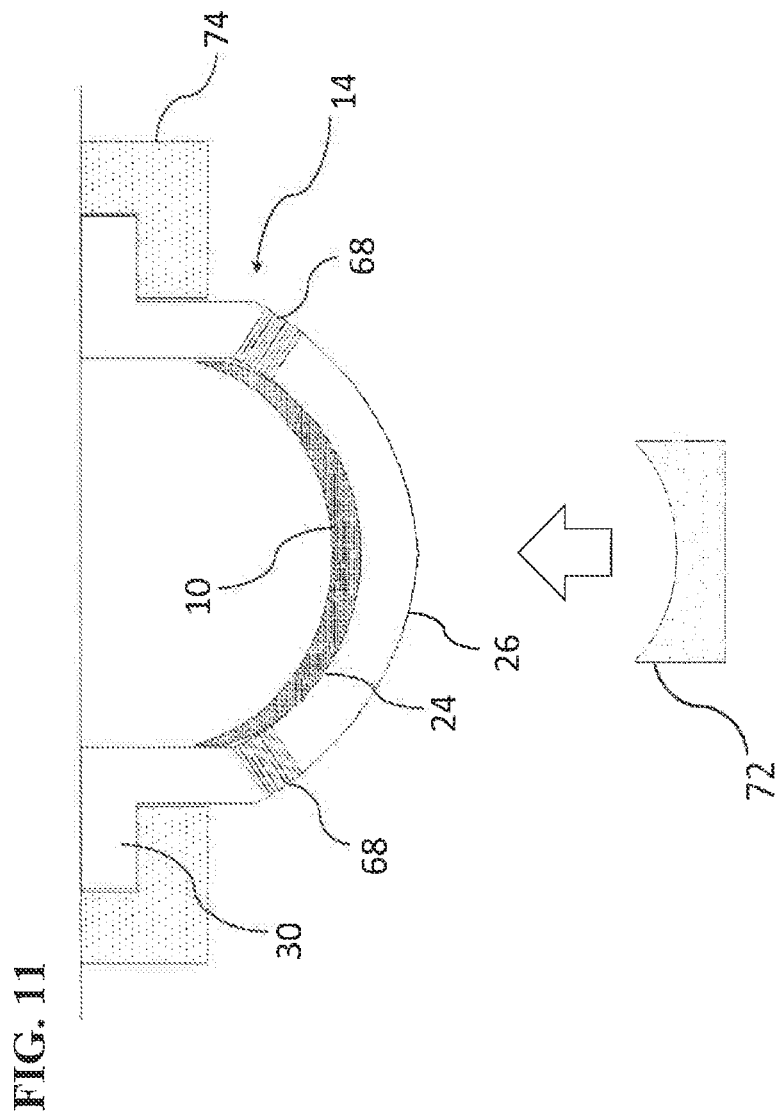
FIG. 11 is a diagram illustrating a third peeling step, and is a sectional side elevation showing a state before being subjected to the third peeling step.

The third peeling step s4 is aimed at entirely peeling the contact lens 10 sticking to the FC formation surface 24 of the lower mold 14 from the FC formation surface 24. In the third peeling step s4, the third press head 72 (also referred to as a third peeling means, a lower-mold main peeling means, or second lower-mold press head; it should be noted that the term "third peeling" may be replaced with "lower-mold main peeling") may be used to press the lower mold pressed surface 26. The state is shown in FIG. 11 (before processing) and FIG. 12 (after processing).

The third press head 72 may be of any form so long as it can peel the contact lens 10 entirely from the lower mold 14 (preferably without being damaged). For example, a cylinder or a concave surface may be employed for a pressing surface (that is, a surface on which the third press head 72 is in contact with the lower mold pressed surface 26, similar explanation will be hereinafter omitted) of the third press head 72. In the case of the concave surface, it is preferred that a diameter is within a range from 9.0 to 9.5 mm (more preferably 9.0 mm), and a curvature is within a range from 9.0 to 11.0 (more preferably 10.0 mm). In the case of the cylinder, it is preferred that an outer diameter is within a range from 7.6 to 8.2 mm (more preferably 7.8-8.0 mm), and an inner diameter is within a range from 6.5 to 7.2 mm (more preferably 6.7 to 7.0 mm). In addition, a side face of a third press head 72 (in FIG. 11, the side face of the third press head 72 faces the front; similar explanation will be hereinafter omitted) is preferably set to be a circular column.

The pressing force of the third press head 72 may be such that the contact lens 10 can be completely peeled from the lower mold 14 (preferably without being damaged). It is preferably in the range from 180 to 220 kgf/cm$^2$, more preferably 200 kgf/cm$^2$.

Pressing amount of the third press head 72 is such that the contact lens 10 can be completely peeled from the lower mold 14 (preferably without being damaged). It is preferably in the range from 4.2 to 4.6 mm, more preferably 4.4 mm. With the Pressing amount less than 4.2 mm, the lower mold pressed surface 26, once deformed to have a reverse curvature upon pressing with the third press head, will restore its original state, which makes it difficult for the contact lens 10 to be peeled from the lower mold 14. With the pressing amount more than 4.6 mm, the lower mold 14 is easily damaged. In other words, pressing amount of 4.4 mm achieves the best balance between the conflicting conditions, i.e., not to damage the lower mold 14 and to peel the periphery portion of the contact lens 10 from the lower mold 14.

The lower mold 14 is held its posture with a forth retainer 74. The forth retainer 74 may be of any form so long as it has a clearance considering workability while maintaining the posture of the lower mold 14. For example, it can fix the lower mold 14 in the posture such that the lower mold pressed surface 26 faces directly downward in the vertical direction (that is, FC formation surface 24 facing directly upward, see FIG. 11). Alternatively, it can fix the lower mold 14 in the posture such that the lower mold pressed surface 26 faces directly upward in the vertical direction (that is, FC formation surface 24 facing directly downward, not shown).

Examples of the forth retainer include, for example, a rail, an aspiration tube, and a pedestal. Preferably, it is a rail. The forth retainer 74 having too large clearance fails to adjust centering of the lower mold 14. Meanwhile, the forth retainer 74 having too small clearance impairs workability during installing/removing the lower mold 14.

Shifting FIG. 11 to FIG. 12, the third press head 72 presses the lower mold pressed surface 26 from directly below to directly above in the vertical direction of the lower mold 14 whose posture is fixed by the forth retainer 74. When a stress is applied again onto the lower mold pressed surface 26, the center portion of the convex lower mold pressed surface 26 partially deforms to be concaved. At this time, a curvature of a part of the FC formation surface 24 deforms to become a reverse curvature (concave FC formation surface inverts to become partially convex). At the time of pressing, it is preferred to coincide the central position of the lower mold pressed surface 26 in a planar view with the central position of the pressing surface of the third press head 72. In this step, the center of the lower mold pressed surface 26 is pressed as described above. Hereinafter, the site to be pressed is in the state as described above, unless otherwise specified.

In this case, a curvature of the FC formation surface 24 is partially deformed to have a reverse curvature, thus the area where near the center of the contact lens 10 is in contact with the FC formation surface 24 becomes smaller. Accordingly, the contact lens 10 can be easily removed. In addition, when pressed with the third press head 72, the periphery portion of the contact lens 10 has been already peeled off. Therefore, stress derived from the third press head 72 is not applied to the periphery portion of the contact lens 10. Accordingly, the contact lens 10 remains undeformed and undamaged.

As described above, the periphery portion of the contact lens 10 is firstly rendered to be peeled from the FC formation surface 24, and then the portion other than the periphery portion is rendered to be peeled from the FC formation surface 24. In order to peel the periphery portion of the contact lens 10, load is applied to the lower mold pressed surface 26 so as to make the crease 68 in the peripheral portion of the lower mold pressed surface 26. Accordingly, the lower mold pressed surface 26 (and thus the FC formation surface 24) can be deformed with weak force.

The periphery portion of the contact lens is firstly peeled off In addition, the force to peel off the periphery portion of the contact lens 10 from the lower mold 14 is applied in a manner different from the manner to apply force to peel off the entire contact lens from the lower mold. Accordingly, the contact lens may be easily demolded (preferably without being damaged).

In this way, the contact lens sticking to the workpiece can be removed in a dry state (preferably without being damaged) at high probability without using extensive procedures.

An automatically controlled method wherein the demolding step S4 is connected to the upstream and downstream steps will be hereinafter explained. The description is given as an only example of the constitution and does not limit the present invention. Each steps of the demolding step S4 described above may be used solely.

Figure 13:
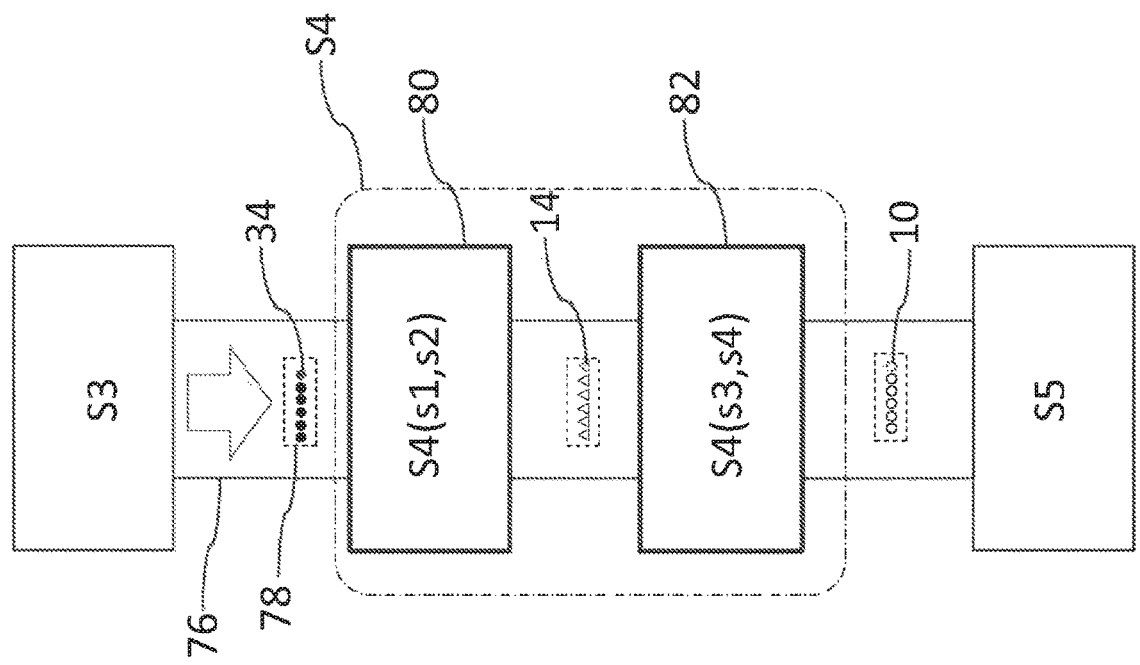
FIG. 13 is a schematic diagram showing an exemplary arrangement of a manufacturing equipment in a clean room as an example of a manufacturing step of a contact lens according to an embodiment of the present invention.

FIG. 13 is a schematic view showing an exemplary arrangement upstream and downstream of the demolding step S4 as an example of a method for manufacturing the contact lens 10 according to the present invention. As can be seen, the demolding step S4 (indicated by dashed-dotted box) is provided between the polymerization step S3 and the inspection step S5, respective steps being connected with each other via a belt conveyor 76. It should be noted that any form of means can be adopted as long as the workpiece 34 can be conveyed without being damaged. For example, a conveying method whereby the workpiece 34 is transferred, for example, on a belt or roller and the movement of the workpiece 34 is halted or proceeded by a loader or unloader may be mentioned.

A tray 78 (indicated as a dotted box) on which a plurality of workpieces 34 after the polymerization step S3 is completed are mounted is transported on a belt conveyer 76 and charged in a separator 80. In a demolding step S4, the lower mold 14 is separated from the workpiece 34 by the separator 80, and the contact lens 10 is peeled from the lower mold 14 by a peeler 82.

The first peeling step s1 and the separation step s2 are conducted by the separator 80 described above. The separator 80 is provided with the first press head 36, the first retainer 38, the pawls 40, 42, the second retainer 44, a first arm, an upper mold collector, and a second arm (not shown).

In the separator 80, when the workpiece 34 transported from the polymerization step S3 is charged into the separator 80, the workpiece 34 is fixed onto the first retainer 38, and the upper mold pressed surface 18 is pressed with the first press head 36. The first arm removes the workpiece 34, which has been pressed, from the first retainer 38, and the workpiece 34 is inverted, and the workpiece 34 is placed onto the second retainer 44. When the pawls 40, 42 are inserted into the workpiece 34, the contact lens 10 is peeled from the upper mold 12, and the upper mold 12 falls spontaneously into the upper mold collector. The lower mold 14 supported by the second retainer 44, and the pawls 40, 42 is transferred by the second arm to a tray 78 waiting on the belt conveyer 76.

Thereafter, the peeler 82 described above is used to conduct the second peeling step s3 and the third peeling step s4. The peeler 82 is provided with the second press head 66, the third retainer 70, the third press head 72, the forth retainer 74, a third arm, and an adsorber (not shown).

In the peeler 82, when the lower mold 14 transported from the separator 80 is charged in the peeler 82, the lower mold 14 is fixed onto the third retainer 70, and the lower mold pressed surface 26 is pressed with the second press head 66. The third arm removes the lower mold 14, which has been pressed with the second press head 66, from the third retainer 70, then the lower mold 14 is inverted, and placed on the forth retainer 74. At that time, the flange 30 of the lower mold 14 is supported by the forth retainer 74 as shown in FIG. 11 described above, and directed to a posture with the FC formation surface 24 facing directly upward and the lower mold pressed surface 26 facing directly downward.

Figure 12:
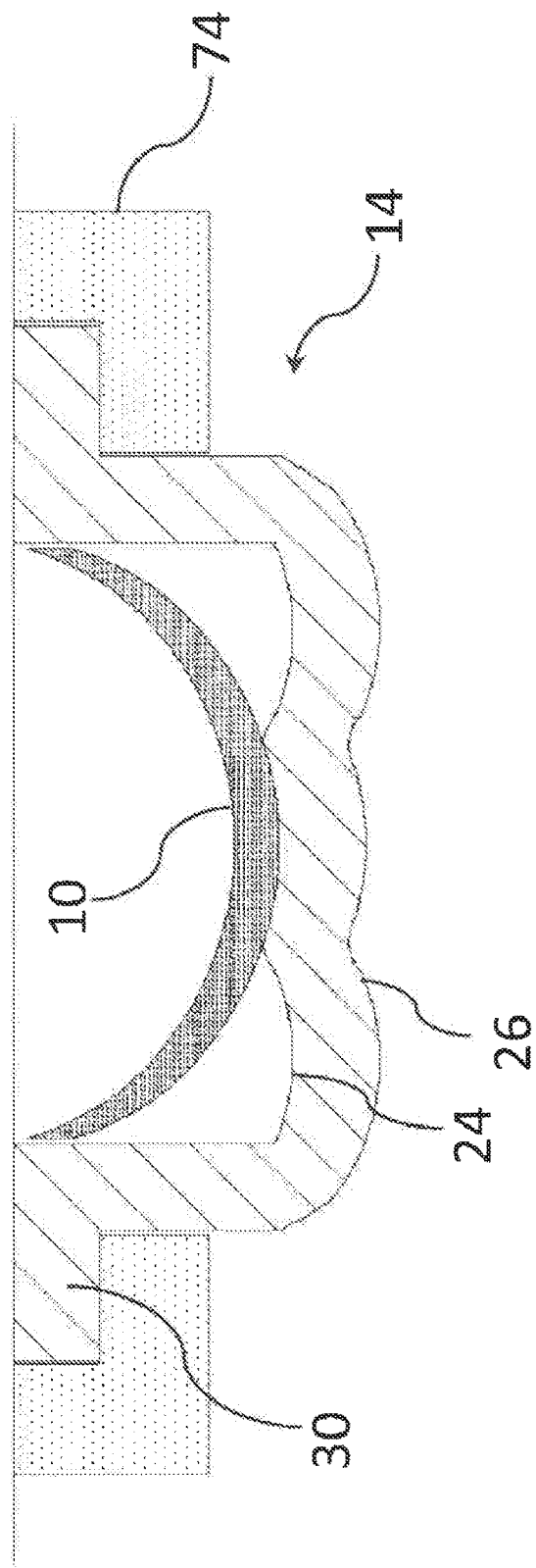
FIG. 12 is a diagram illustrating the third peeling step, and is a sectional side elevation showing a state after being subjected to the third peeling step.

When the lower mold pressed surface 26 is pressed with the third press head 72, as shown in FIG. 12, the central portion of the lower mold pressed surface 26 is deformed, and thus the contact lens 10 is completely peeled from the lower mold, which makes it easy to remove the contact lens with the adsorber.

In this way, the contact lens 10 peeled from the lower mold 14 is removed with the adsorber, and transferred onto a tray 78 waiting on the belt conveyor 76.

EXAMPLE

3. Examples and Comparative Examples

Examples of the present invention will be illustrated below. For convenience of explanation, reference symbols are omitted.

FIG. 14 is a diagram illustrating the Inventive Examples 1 to 8 and Comparative Examples 1 to 5. It should be noted that reference symbols are omitted for convenience of explanation in Examples and Comparative Examples.

The lower mold retention ability in the drawings means percentage of the contact lens sticking to the lower mold after the separation step via the first peeling step, relative to the number of the input contact lenses in the demolding step (also referred to as the sample number), and is expressed by the following equation 1:

[Eq. 1]

$$\text{Lower mold retention ability}(\%) = \frac{\text{Number of lower molds having contact lenses sticking thereto}}{\text{Sample number}} \quad \text{(Equation 1)}$$

The demoldability means percentage of the contact lenses peeled from the lower mold after the third peeling step via the second peeling step based on the sample number, and is expressed by the following equation 2.

[Eq. 2]

$$\text{Demoldability}(\%) = \frac{\text{Number of contact lenses peeled from lower mold}}{\text{Sample number}} \quad \text{(Equation 2)}$$

Further, non-defective rate means a percentage of products peeled from the lower mold which is determined in the inspection step to be non-defective rather than defective owing to the demolding step, and is expressed by the following equation 3.

[Eq. 3]

$$\text{Non-defective ratio}(\%) = \frac{\text{Number of contact lenses determined as non-defective}}{\text{Sample number}} \quad \text{(Equation 3)}$$

Example 1

As the first press head, a circular column having a diameter of 7.0 mm was used. As the pressing surface of the second press head, a concave surface having a diameter of 12.9 mm and a curvature of 9.5 mm was used. As the pressing surface of the third press head, a concave surface having a diameter of 9.0 mm and a curvature of 1.0 mm was used.

Once the workpiece having a silicone-containing contact lens which had been polymerized in the polymerization step was applied to the demolding step, the separator fixed the workpiece after polymerization on the first retainer, and applied load of about 200 kgf/cm$^2$ on the first press head to press the upper mold pressed surface to a depth of 0.35 mm. Further, the separator inverted the workpiece upside-down after being pressed and then fixed the workpiece to the second retainer, and separated the upper mold from the lower mold by inserting the pawls. As a result, the retention ability of the lower mold was 100%.

In addition, the peeler fixed thus separated lower mold onto the third retainer, applied a load of about 200 kgf/cm$^2$ onto the second press head to push down the lower mold pressed surface by 1.7 mm. At that time, only the periphery portion of the contact lens was peeled from the lower mold. The peeler inverted the lower mold upside down after being pressed, fixed the lower mold to the forth retainer, and applied a load of about 200 kgf/cm$^2$ onto the third press head to push down the lower mold pressed surface by 4.4 mm. At that time, a part of the FC formation surface is deformed to have a reverse curvature, and thus an entire contact lens was peeled from the lower mold. The peeler further removed the contact lens on a deformed FC formation surface. As a result, demoldability and non-defective rate were 100%.

Example 2

The procedures in Example 1 were repeated except that a circular column (diameter, 8.0 mm) was used as the first press head. As a result, all of the lower mold retention ability, demoldability, and non-defective rate were 100%.

Example 3

The procedures in Example 1 were repeated except that a circular column (diameter, 9.0 mm) was used as the first press head. As a result, all of the lower mold retention ability, demoldability, and non-defective ratio were 100%.

Example 4

As the first press head, a circular column (diameter, 8.0 mm) was used, as the second press head, a concave surface (diameter, 13.3 mm; curvature, 11.5 mm) was used, and as the pressing surface of the third press head, a cylinder (outer diameter (diameter), 7.8 mm, inner diameter, 6.7 mm) was used. Except the forgoing, the same procedures as those in Example 1 were repeated. As a result, the lower mold retention ability, demoldability, and non-defective ratio were 100%.

Example 5

As the pressing surface of the third press head, a cylinder (outer diameter, 8.0 mm; inner diameter, 7.0 mm) was used. Except for the foregoing, the same procedures as those in Example 4 were repeated. As a result, the lower mold retention ability, demoldability, and non-defective ratio were 100%.

Owing to the third peeling step, the FC formation surface partially deformed from a concave form to a convex form.

However, the partially deformed area was larger than those in other Examples. In addition, a concaved area which did not deform to become convex, in the vicinity of a center of the FC formation surface were also expanded. Accordingly, the adhered area between a portion in a vicinity of the center of the FC formation surface and a portion in a vicinity of the center of the contact lens was also expanded.

Example 6

As the first press head, a circular column (diameter, 5.0 mm) was used. Except that, the same procedures as in Example 4 were repeated. As a result, the lower mold retention ability and demoldability were 100%. Therefore, the effect of the present invention was confirmed to be exerted in the present example as well. On the other hand, circular defects (impressions) were observed at the portion near the center of some contact lenses, which defects were considered to be generated when the first press head push down the upper mold pressed surface in the first peeling step. As a result, non-defective ratio was 30%.

In the present example, a diameter of the first press head is 5.0 mm. The diameter is, although by only several millimeters, out of the preferred range described in the present embodiment (diameter, 7.0 to 10.0 mm). Nevertheless, there are considerable difference between the present example and Example 4 in non-defective ratio. Briefly, the present example shows that the aforementioned preferred range with respect to the first press head has a great critical significance.

Example 7

As the first press head, an octagonal column (that is, an octagonal prism, whose pressing surface is flat, and a circumscribed circle diameter is 7.8 mm) was used. Except that, the same procedures as in Example 5 were repeated. As a result, the lower mold retention ability was 93%, and both of demoldability and non-defective ratio were 93% owing to the lower mold retention ability.

Example 8

As a pressing surface of the third press head, a cylinder (outer diameter, 7.6 mm; inner diameter, 6.5 mm) was used. Except that, the same procedures as in Example 4 were repeated. As a result, the lower mold retention ability and demoldability were 100%. It was confirmed that the effect of the present invention can be exerted in the present example. On the other hand, when the third press head pushed down the lower mold pressed surface in the third peeling step, the contact lens fell out of the lower mold, and several contact lenses could not recovered. As a result, non-defective ratio was 40%.

In the present example, a cylinder had an outer diameter of 7.6 mm and an inner diameter of 6.5 mm. The diameter was, although only by submilimeters, out of the preferred range described in the present embodiment (outer diameter, 7.8 to 8.0 mm; inner diameter, 6.7 to 7.0 mm). Nevertheless, there are considerable difference between the present example and Example 4 in non-defective ratio. In short, the present example showed that the aforementioned preferred range regarding the third press head had a great critical significance.

Comparative Example 1

The separation step was conducted in the same manner as in Example 1, except that the first separation step was not conducted. The resulting lower mold retention ability was 40%. All of the contact lenses charged in the peeler were removed, and all of them were determined as non-defective in the subsequent inspection step. However, demoldability and non-defective ratio were as low as 40% due to absence of the first peeling step.

Comparative Example 2

The same procedures were repeated in Example 2, except that the second peeling step was not conducted. As a result, although the lower mold retention ability was as high as 100%, the following faults were generated, resulting in demoldability of 0%. Namely, the lower mold cannot endure against pressure by the third press head and is damaged. Even if it could resist the pressure, the contact lens follows the deformation of the FC formation surface which is deformed during the third peeling step and the contact lens remains sticking to the lower mold. Therefore, the contact lens strongly adhered to the lower mold and was apt to be hardly removed when aspirated using an aspirator.

Comparative Example 3

The first peeling step and the separation step were conducted in the same manner as in Example 7, providing the lower mold retention ability of 90%. Subsequently, the third peeling step was conducted in the same manner as in Example 4, except that the second peeling step was not conducted. As a result, contact lenses were deformed following the FC formation surface during the third peeling step. Therefore, they could not be removed by an aspirator. However, there are a few contact lenses that do not follow the FC formation surface. As a result, demoldability and non-defective ratio were 10%.

Comparative Example 4

As the first press head, an octagonal column (diameter of circumscribed circle, 7.8 mm) was used, and as the pressing surface of the second press head, a concave surface (diameter 13.1 mm, curvature 11.5 mm) was used, and the second demolding step and the third demolding step were conducted in the reverse order. In other words, the third peeling step was followed by a second peeling step. Other procedures were same as in Example 4.

When the first peeling step and the separation step were conducted, the lower mold retention ability was 90%. Subsequently, the third demolding step was conducted. Some contact lenses followed the deformation of the lower mold, while other contact lenses did not follow the deformation of the lower mold and were peeled from the lower mold in some cases. Finally, when the second demolding step was conducted, the contact lens followed the deformation of the lower mold and was not peeled from the lower mold. As a result, demoldability and non-defective rate were 10%.

Comparative Example 5

Procedures in Example 7 were repeated except that the third peeling step was not conducted. As a result, the lower mold retention ability was 97%. However, the contact lens remained sticking to the lower mold, and could not be removed from the lower mold by an aspirator. Therefore, demoldability and non-defective rate were 3%.

4. OTHER PREFERRED EXAMPLE

The technical scope of the present invention is not limited by the aforementioned embodiment, and variously modified and/or improved version may be included so long as it can derive a particular effect obtained by an inventive constitutional requirement or a combination thereof as well.

(First Peeling Step)

The first peeling step according to the present embodiment is a step of partially peeling the contact lens from the upper mold without being damaged. It is a step constituting the present embodiment. The first peeling step itself has a great technical significance.

To be more specific, before the present inventor invented the present embodiment, at the time of separating the upper mold and the lower mold from the workpiece, whether the contact lens interposed therebetween sticks to the upper mold or the lower mold was extremely random. If such sticking occurs randomly, some workpieces require an operation to peel the contact lens from the upper mold while other workpieces require the operation to be switched to peel the contact lens from the lower mold, requiring additional procedures.

However, in the first peeling step according to the present embodiment, it is possible to ensure that the contact lens remains sticking to the FC formation surface of the lower mold. In other words, it is possible to ensure that the contact lens is peeled from the upper mold.

Considering the foregoing, the first peeling step according to the present embodiment may sufficiently constitute the present invention by itself, which is represented by the following constitution.

"A contact lens manufacturing method (or device) for removing a contact lens from a pair of molds, the contact lens being produced by polymerizing a monomer included in the pair of molds which are obtained by assembling a lower mold for forming a front curve of the contact lens and an upper mold for forming a base curve of the contact lens, the method (or device) including:

a first peeling step (or a first peeling means) of peeling the contact lens from a lens-formation surface of the upper mold, while the contact lens remains sticking to the lower mold."

It should be noted that, after the first peeling step in the above constitution has been conducted, the respective steps described in the present embodiment may be preferably conducted. However, other known procedures may be used to produce the contact lens. In addition, in the above constitution, a material for the lower mold is not particularly limited. In that case, the contact lens is peeled from the lower mold using a known procedure to provide the contact lens.

(Pawls and Separation Step)

The pawl which was used to separate the upper mold and lower mold of the workpiece in the separation step in the present embodiment itself has a great technological significance.

To be more specific, before the present inventor created the present embodiment, separation of the upper mold and the lower mold from the workpiece was unstable. For example, when the workpiece was inclined, the pawl was inserted from an angled direction, resulting in insufficient separation, or a mating of the workpiece was so tight that separation was not certainly attained even if the pawl was inserted. However, using the pawls according to the present invention, it is possible to reliably separate the upper mold and the lower mold from the workpiece.

Considering the foregoing, the pawl, i.e., a separating means (a jig) according to the present embodiment may singly constitute an invention, which is represented by the following constitution:

"A jig for separating an upper mold and a lower mold from a workpiece obtained by assembling the lower mold for forming a front curve of a contact lens and the upper mold for forming a base curve of the contact lens, the jig including an edge which is to be inserted between the lower mold and the upper mold and has two opposing surfaces toward the pair of molds, wherein, in the edge, one of the two faces has a first tapered portion (preferably a center portion of the edge having a half-arc-like notch) and other surface has a second tapered portion (preferably an end portion of the edge), the first taper being formed so that a thickness increases toward a direction opposite to a direction toward the pair of molds and upward, and the second taper being formed so that a thickness increases toward the direction opposite to the direction toward the pair of molds and downward."

The aforementioned constitution is just for a jig for disassembling the workpiece and materials for the upper and lower mold are not particularly limited. The separation step s2 using the jig also has a great technological significance, and the separation step s2 itself also has a great technological significance.

(First Peeling Step Plus Separation Step)

The first peeling step according to the present embodiment itself has a great technological significance in that the contact lens can be partially peeled from the upper mold without being damaged. After that, a separating step is conduct. That is why the upper mold and the lower mold can be separated while the contact lens is reliably sticking to the FC formation surface. Accordingly, the constitution combining the first peeling step and the separation step itself has a great technological significance, which is represented by the following constitution.

"A contact lens manufacturing method (or device) for removing a contact lens from a pair of molds, the contact lens being produced by polymerizing a monomer included in the pair of molds which are obtained by assembling a lower mold for forming a front curve of the contact lens and an upper mold for forming a base curve of the contact lens, the method (or a device) including:

a first peeling step (or a first peeling means) to peel the contact lens from the lens formation surface of the upper mold while the contact lens remains sticking to the lower mold; and a separation step (or a separation means) to separate the upper mold and the lower mold having the contact lens sticking thereto."

(Second Peeling Step Plus Third Peeling Step)

A combination of the first peeling step and a separation step itself has a great technical significance in that the upper mold and the lower mold are separated while ensuring the contact lens sticking to the FC formation surface. Meanwhile, there is a problem as described in the section of problems to be solved by the invention about how to peel the contact lens sticking to the FC formation surface of the lower mold as well.

In other words, the aforementioned problems relating to peeling of the contact lens sticking to the FC formation surface of the lower mold can be solved by combining a second peeling step and the third peeling step in the present embodiment. Accordingly, a constitution combining the second peeling step and the third peeling step itself has a great technical importance. The constitution is expressed as follows:

"A contact lens manufacturing method (or device) for removing a contact lens from a pair of molds, the contact lens being produced by polymerizing a monomer included in the pair of molds which are obtained by assembling a lower mold for forming a front curve of the contact lens and an upper mold for forming a base curve of the contact lens, the method (or a device) including:

a pre-peeling step (or a pre-peeling means) to peel the periphery portion of the contact lens sticking to a lens formation surface of the lower mold, and a main peeling step to peel the contact lens whose periphery portion sticks to the lens formation surface of the lower mold."

It should be noted that, in the above constitution, since each step may begin with the state where the contact lens remains sticking to the FC formation surface of the lower mold in the above constitution (i.e., since the first peeling step s1 in the present embodiment has already been conducted), the second peeling may be referred to as the first peeling, and the third peeling may be referred to as the second peeling. Moreover, as mentioned above, the second peeling may be referred to as a pre-peeling of the lower mold and the third peeling may be referred to as a main peeling of the lower mold.

In addition, it is sufficient to prepare the aforementioned constitution in which the lower mold has the contact lens sticking to a FC formation surface thereof (i.e., after the upper mold is separated). For the purpose, a material for the upper mold is not particularly limited. Therefore, a material other than resins such as a quartz may be used for the upper mold. In that case, the upper mold and the lower mold are separated according to the procedure of the present embodiment or the known procedure, and subsequently the lower mold with the contact lens sticking thereto is selected. Then, the aforementioned constitution may be applied.

10 Contact lens
12 Upper mold (base curve mold)
14 Lower mold (front curve mold)
16 First lens-formation surface (BC formation surface)
18 First non-lens-formation surface (upper mold pressed surface)
22, 30 Flange
24 Second lens-formation surface (FC formation surface)
26 Second non-lens-formation surface (lower mold pressed surface)
32 Mixed monomer liquid containing contact lens base material (monomer)
34 Workpiece
36 First press head
40, 42 Pawl
66 Second press head
72 Third press head
80 Separator
82 Peeler

The invention claimed is:

1. A contact lens manufacturing method for removing a contact lens from a pair of molds, the contact lens being produced by polymerizing a monomer included in the pair of molds which are obtained by assembling a lower mold having a flange for forming a front curve of the contact lens and an upper mold having a flange for forming a base curve of the contact lens so that the flange of the lower mold and the flange of the upper mold are bonded, the method comprising:

(A) a first peeling step of partially peeling the contact lens from a lens- formation surface of the upper mold by pressing a non-lens-formation surface which is a back surface of the lens-formation surface of the upper mold, the first peeling step being performed while maintaining the assembled state of the upper mold and the lower mold by the bonding of the flange of the upper mold and the flange of the lower mold;

(B) a separation step of separating the upper mold from the lower mold having the contact lens sticking thereto by disassembling the assembled state of the upper mold and the lower mold by releasing the bonded state of the flange of the upper mold and the flange of the lower mold by inserting a wedge-shaped jig for separating between the flange of the upper mold and the flange of the lower mold after the first peeling step;

(C) a second peeling step of peeling the periphery portion of the contact lens sticking to a lens-formation surface of the lower mold after the separation step; and (D) a third peeling step of peeling the contact lens, the periphery portion of which has been peeled, from the lens-formation surface of the lower mold after the second peeling step.

2. The contact lens manufacturing method according to claim 1, wherein the first peeling step comprises using a first press head which is a circular column or a polygonal column having a diameter of 5.0 to 10.0 mm, the diameter of the polygonal column being a diameter of a circumcircle of the polygonal column; and the first press head presses a non-lens-formation surface which is a back surface of the lens-formation surface of the upper mold.

3. The contact lens manufacturing method according to claim 2, wherein the non-lens-formation surface of the upper mold is directed to a directly upward or downward posture in the vertical direction before being pressed by the first press head in the first peeling step.

4. The contact lens manufacturing method according to claim 1, wherein the non-lens-formation surface of the upper mold is directed to a vertically downward posture before a pawl is inserted between flanges provided on the lower and upper molds.

5. The contact lens manufacturing method according to claim 1, wherein the second peeling step comprises using a second press head whose pressing surface is a concave surface and a curvature of the concave surface is equal to or more than a curvature of a non-lens-formation surface which is a back surface of the lens formation surface of the lower mold, and the second press head presses the non-lens-formation surface of the lower mold.

6. The contact lens manufacturing method according to claim 5, wherein the non-lens-formation surface of the lower mold is directed to a directly upward or downward posture in the vertical direction in the second peeling step before being pressed with the second press head.

7. The contact lens manufacturing method according to claim 1, wherein the third peeling step comprises a third press head whose pressing surface is a concave surface or an end face of a cylinder; and the third press head presses a non-lens-formation surface which is a back surface of the lens formation surface of the lower mold.

8. The contact lens manufacturing method according to claim 7, wherein the non-lens-formation surface of the lower mold is directed to a directly upward or downward posture in the vertical direction in the third peeling step before being pressed with the third press head.

9. The contact lens manufacturing method according to claim 1, wherein a material of the contact lens is hydrogel.

10. A contact lens manufacturing device for removing a contact lens from a pair of molds, the contact lens being produced by polymerizing a monomer included in the pair of molds which are obtained by assembling a lower mold having a flange for forming a front curve of the contact lens and an upper mold having a flange for forming a base curve of the contact lens so that the flange of the lower mold and the flange of the upper mold are bonded;
the device comprising:
- (A) a first peeling means of partially peeling the contact lens from a lens- formation surface of the upper mold by pressing a non-lens-formation surface which is a back surface of the lens-formation surface of the upper mold, the first peeling means performing the peeling while maintaining the assembled state of the upper mold and the lower mold by the bonding of the flange of the upper mold and the flange of the lower mold;
- (B) a separating means for separating the upper mold from the lower mold with the contact lens sticking thereto by releasing the bonded state of the flange of the upper mold and the flange of the lower mold by inserting a wedge-shaped jig for separating between the flange of the upper mold and the flange of the lower mold after the peeling by the first peeling means:
- (C) a second peeling means for peeling a periphery portion of the contact lens sticking to a-lens formation surface of the lower mold after the separation by the separating means; and
- (D) a third peeling means for peeling the contact lens, the periphery portion of which has been peeled, from the-lens formation surface of the lower mold after the peeling by the second peeling means.

11. The contact lens manufacturing device according to claim 10, wherein the first peeling means includes a first press head which is a circular column or a polygonal column having a diameter of 5.0 to 10.0 mm, the diameter of the polygonal column being a diameter of a circumcircle of the polygonal column.

12. The contact lens manufacturing device according to claim 10, wherein the second peeling means includes a second press head whose pressing surface is a concave surface and the curvature of the concave surface is equal to or more than the curvature of a non-lens-formation surface which is a back surface of the lens formation surface of the lower mold.

13. The contact lens manufacturing device according to claim 10, wherein the third peeling means comprises a third press head whose pressing surface is a concave surface or an end face of a cylinder.

14. A method for removing a contact lens from a pair of molds which are obtained by assembling a lower mold having a flange for forming a front curve of the contact lens and an upper mold having a flange for forming a base curve of the contact lens so that the flange of the lower mold and the flange of the upper mold are bonded; the method comprising:
- (A) a first peeling step to partially peel the contact lens from a lens-formation surface of the upper mold by pressing a non-lens-formation surface which is a back surface of the lens- formation surface of the upper mold using a first press head having a horizontally flat contacting surface in relation to the downward direction, and in a pressing amount within a range of 0.3 to 0.4 mm, the first peeling step being performed while maintaining the bonded state of the flange of the upper mold and the flange of the lower mold;
- (B) a separation step of separating the upper mold from the lower mold having the contact lens sticking thereto by disassembling the assembled state of the upper mold and the lower mold by releasing the bonded state of the flange of the upper mold and the flange of the lower mold by inserting a wedge-shaped jig for separating between the flange of the upper mold and the flange of the lower mold after the first peeling step;
- (C) a second peeling step to peel the periphery portion of the contact lens sticking to a lens-formation surface of the lower mold after the separation step; and
- (D) a third peeling step to peel the contact lens, the periphery portion of which has been peeled, from the lens-formation surface of the lower mold after the second peeling step.

15. A jig for separating an upper mold and a lower mold of a pair of molds to remove a contact lens, the pair of molds having been obtained by assembling the lower mold for forming a front curve of the contact lens and the upper mold for forming a base curve of the contact lens, the contact lens being produced by polymerizing a monomer included in the pair of molds, the jig comprising:
- an edge to be inserted as a wedge between a flange of the upper mold and a flange of the lower mold toward the pair of molds;
- a half-arc-like notched portion having a first directly upward taper formed on the center portion of the edge in the extending direction, the first taper being formed so that a thickness increases toward a direction opposite to a direction toward the pair of molds and upward; and
- an end portion having a second taper on the portion of the edge other than the notched portion, the second taper being formed so that a thickness increases toward the direction opposite to the direction toward the pair of molds and downward.

16. A contact lens manufacturing method for removing a contact lens from a pair of molds, the contact lens being produced by polymerizing a monomer included in the pair of molds which are obtained by assembling a lower mold having a flange for forming a front curve of the contact lens and an upper mold having a flange for forming a base curve of the contact lens so that the flange of the lower mold and the flange of the upper mold are bonded, the method comprising:
- a separation step of separating the upper mold from the lower mold having the contact lens sticking thereto by disassembling the assembled state of the upper mold and the lower mold by inserting a wedge-shaped jig for separating between the flange of the upper mold and the flange of the lower mold to release the bonded state of the flange of the upper mold and the flange of the lower mold;
- a pre-peeling step of the lower mold to peel a periphery portion of the contact lens sticking to a lens-formation surface of the lower mold; and
- a main peeling step of the lower mold to peel the contact lens, whose periphery portion has been peeled, from the lens-formation surface of the lower mold by pressing the non-lens-formation surface of the lower mold to deform a concave shape of the lens-formation surface of the lower mold into a convex shape after the pre-peeling step of the lower mold.

17. A contact lens manufacturing device for removing a contact lens from a pair of molds, the contact lens being produced by polymerizing a monomer included in the pair of molds which are obtained by assembling a lower mold having a flange for forming a front curve of the contact lens and an upper mold having a flange for forming a base curve of the contact lens so that the flange of the lower mold and the flange of the upper mold are bonded, the device comprising:

a separating means of separating the upper mold from the lower mold having the contact lens sticking thereto by disassembling the assembled state of the upper mold and the lower mold by inserting a wedge-shaped jig for separating between the flange of the upper mold and the flange of the lower mold to release the bonded state of the flange of the upper mold and the flange of the lower mold;

a pre-peeling means of the lower mold to peel a periphery portion of the contact lens sticking to a lens-formation surface of the lower mold; and a main peeling means of the lower mold to peel the contact lens, whose periphery portion has been peeled, from the lens-formation surface of the lower mold by pressing the non-lens-formation surface of the lower mold to deform a concave shape of the lens-formation surface of the lower mold into a convex shape.

18. The contact lens manufacturing method according to claim 9, wherein hydrogel is silicone hydrogel.

19. The contact lens manufacturing method according to claim 1, wherein, in the third peeling step, the contact lens the periphery portion of which has been peeled, is peeled from the lens-formation surface of the lower mold by pressing the non-lens formation surface of the lower mold to deform a concave shape of the lens formation surface of the lower mold into a convex shape.

* * * * *